United States Patent [19]

Wang et al.

[11] Patent Number: 5,134,480

[45] Date of Patent: * Jul. 28, 1992

[54] TIME-RECURSIVE DEINTERLACE PROCESSING FOR TELEVISION-TYPE SIGNALS

[75] Inventors: Feng-Ming Wang; Dimitris Anastassiou, both of New York, N.Y.; Arun N. Netravali, Westfield, N.J.

[73] Assignees: The Trustees of Columbia University in the City of New York; American Telephone and Telegraph Company, both of New York, N.Y.

[ * ] Notice: The portion of the term of this patent subsequent to Apr. 17, 1992 has been disclaimed.

[21] Appl. No.: 576,676

[22] Filed: Aug. 31, 1990

[51] Int. Cl.$^5$ .................. H04N 7/01; H04N 11/20
[52] U.S. Cl. .................. 358/140; 358/11; 358/105
[58] Field of Search .............. 358/136, 140, 138, 105, 358/11, 12

[56] References Cited

U.S. PATENT DOCUMENTS

| | | | |
|---|---|---|---|
| 4,901,145 | 2/1990 | Harradine et al. | 358/140 X |
| 4,937,667 | 6/1990 | Choquet et al. | 358/140 |
| 4,982,285 | 1/1991 | Sugiyama | 358/136 |
| 4,985,768 | 1/1991 | Sugiyama | 358/136 |
| 5,010,401 | 4/1991 | Murakami et al. | 358/105 X |

Primary Examiner—Victor R. Kostak
Attorney, Agent, or Firm—Brumbaugh, Graves, Donohue & Raymond

[57] ABSTRACT

Deinterlacing systems and methods useful with television and other interlaced data signals derive values for pixels on missing lines using best matching values for blocks of pixels through time-recursive comparison of current pixels block values with such values for prior frames of data and also with later frames. Noise propagation is attenuated by mixing of current interpolated pixel data and memory size efficiency is achieved by comparisons based on blocks of pixels, with the block size adjustable for data accuracy. Use of chrominance signal comparisons and reduced data rate coding techniques provide added capabilities to the deinterlacing systems and methods.

39 Claims, 9 Drawing Sheets

TO PROCESSING ELEMENT 2

○ : PROCESSING ELEMENT 1
□ : DELAY ELEMENT 4

PROCESSING ELEMENT 1

PROCESSING ELEMENT 2

TIME-RECURSIVE DEINTERLACE PROCESSING FOR TELEVISION-TYPE SIGNALS

BACKGROUND OF THE INVENTION

This invention relates to methods and systems capable of processing interlaced television fields to convert to progressively scanned format with effective increase in vertical resolution and reduction of artifacts in image sequences.

Interlaced scanning is an efficient method of bandwidth compression for television transmission. However, in addition to the loss of vertical resolution, interlacing results in many well known artifacts. With frame memories becoming widely available, improved definition television (IDTV) can display non-interlaced video by appropriate processing at the receiver without changing the scanning structure of the current television system, such as the NTSC (National Television Systems Committee) system used in the United States. Proper conversion from interlaced to progressive format reduces line flicker and improves the vertical resolution of the displayed images. Such techniques are also important in high definition television (HDTV), since many of the current HDTV proposals either involve transmission of interlaced video, or high spatial frequency information at a reduced temporal rate.

FIG. 1 shows the three-dimensional (3-D) domain of a sampled image sequence x (m,n,t), in which the missing lines are in dotted form. In FIG. 2, the vertical-temporal grid (for a constant value of n) is shown, with circles on the scan lines of an interlaced sequence and crosses on the missing lines.

Interlaced scanning introduces aliasing, unless the moving image is properly prefiltered with a low-pass filter. The 3-D frequency responses of three possible such filters are shown in FIG. 3, as a direct consequence of the shape of the quincunx sampling grid (A, B, C, D and X) in FIG. 2. Different reconstruction methods are appropriate for each form of prefiltering. In actual image capturing devices, temporal filtering is due to camera time integration and is performed independent of spatial filtering, resulting in separable prefiltering. If vertical filtering is not strong enough to fully cover the area between two successive field lines, there is indeed some information missing between the field lines, which can be estimated using appropriate models for the image sequence source. From psychophysical experiments, applicants have found that the apparent quality of interlaced video is often the best if it comes from progressive video by dropping half the lines without prefiltering. In that case, deinterlacing only consists of predicting the missing lines, because each existing line remains as is.

For discussion, it is assumed that, preceding interlaced scanning, separable vertical-temporal filtering is done as in the dotted part (external cube) of FIG. 3, i.e. as if the pictures were progressively scanned, with a frame rate equal to the interlaced field rate. Equivalently, such interlaced sequences may be produced by properly dropping half the lines from a progressively scanned sequence. Applicants' experiments show that the resulting aliasing, which gives rise to various interlacing artifacts, is reduced by nonlinear interpolation of the missing lines. This resolution enhancement is a consequence of the fact that the sampling theorem can be "defeated" (e.g. some high frequency information between the solid and dotted volumes of FIG. 3 can be predicted) if there is extra knowledge of the signal source. The source model used for this purpose assumes that the video scene contains a number of rigid objects moving in a translational manner. The same concepts can be used to achieve purely spatial or temporal resolution enhancement. Nonlinear interpolation always reduces the energy of the enhancement signal, defined as the difference between the deinterlaced and the actual signals. Some simple temporal models assume that the image scene contains rigid moving objects, and that the components of their displacement vectors from frame to frame are not necessarily integer multiples of the spatial sampling period. This implies that the same object is sampled in many frames. Considering the overlap of all these sampling grids on a specific object, it is obvious that the "virtual" spatial sampling rate for the object is much denser than the one in any individual frame. Assuming, for the moment, that the image sequence is sampled without any antialiasing prefiltering, the above fact implies that one can derive, at least in theory, a high-definition image sequence from the samples of the many frames in which it was captured. If there is a spatial antialiasing prefiltering, then the blurred frame can be reconstructed from the samples of one frame only, and no additional information is conveyed from the other frames; if there is temporal antialiasing prefiltering, then moving objects will also be blurred. According to perceptual psychology, the human eyes tend to track moving objects. If ideal temporal prefiltering is applied, blurred moving objects will reduce image quality perceptually. This argument shows that it is desirable to apply weaker antialiasing prefiltering schemes, in video capture, than theoretically needed, even for progressively scanned scenes, or to make the amount of such prefiltering dependent on motion in a pixel-by-pixel adaptive manner.

In traditional deinterlacing schemes there are various simple ways to predict the pixel X of a missing line, and various local, motion adaptive, or motion compensated techniques have been proposed. In FIG. 2, A, B, D and D are the pixels above below, behind and in front of pixel X. Intraframe techniques can use line doubling, i.e. $X = A$, linear interpolation i.e.

$$X = \frac{A + B}{2},$$

or more complicated nonlinear spatial interpolation techniques. Such techniques cannot predict information which is lost from the subsampled current field, but appears in neighboring fields and various artifacts may result.

Interframe interpolation can be as simple as $X = C$, or $$X = \frac{C + D}{2}.$$

This is fine for stationary objects in a frame, if there is no motion. The nonlinear median filter $X = \text{Med}(A,B,C)$ usually results in acceptable visual appearance, and is used with success in digital receivers. Even though artifacts still appear, there is some overall obvious improvement over interlaced displays.

If there is motion, then some form of motion compensation must be used. All techniques based on symmetrical matching search for a pair of 2-D blocks centered around the pixel to be predicted, assume constant velocity and cannot provide for acceleration. This does not result in serious visual artifacts when a whole frame is predicted based on the two neighboring frames. However, unacceptable results are found in the problem of deinterlacing, if there is accelerating motion of the objects in the scene.

It is therefore an object of this invention to provide improved methods and systems for converting interlaced scanned data to progressive scanned format and which overcome one or more shortcomings of such prior approaches.

It is a further object of the invention to provide such methods and systems utilizing time - recursive motion compensation and the next future field of data to derive missing pixel values on a best matching basis thus utilizing the history of image values to the present time.

It is a further object of the invention to provide such systems including provision for attenuating noise propagation by proportional inclusion of interpolated current field data in output frame data.

It is a further object of the invention to provide such systems wherein memory is efficiently utilized through data comparison based on blocks of pixels, with the size of such blocks being decreased for greater accuracy where appropriate.

It is also an object of the invention to provide such systems which may be adapted for color signal processing of both luminance and chrominance values and may also or alternatively utilize reduced data rate techniques for greater accuracy or efficiency.

It is an additional object of the invention to provide block matching and other subsystems useful in deinterlacing systems.

SUMMARY OF THE INVENTION

In accordance with the present invention a system, for processing interlaced data signals to provide data omitted from individual fields, includes input means for coupling current and later fields of interlaced data (each such field omitting pixel data for line positions at which pixel data is included in prior and later fields), interpolation means for providing pixel data at omitted line positions in a field by interpolation of pixel data at corresponding positions in prior and later lines of that field, and delayed coupling means for providing prior frame output data. The system also includes block matching system means for comparing current frame data with interpolated later frame data and previous frame output data to select overall best matched data for blocks of pixels for use in frame output data. The processing system may also include a prediction circuit for combining interpolated current frame data with overall best matched data on a pixel by pixel basis in proportions responsive to a selectable constant and for supplying processed frame output data to an output point.

Further in accordance with the invention there is provided a block matching circuit, for comparing current frame data with data in a reference frame. The matching circuit includes input means for supplying current frame data and reference frame data, horizontal matching means for making best matched block comparisons in the horizontal direction as between current and reference frame data and developing corresponding least different value signals and motion vector signals, and vertical comparator means for comparing difference values related to vertical direction vectors to develop least difference value signals and corresponding motion vector signals. The matching circuit also includes quadtree decision means for determining block size to be processed based on predetermined threshold values, first multiplexer means for selecting motion vector values corresponding to the best matched block in response to horizontal and vertical motion vector signals, buffer means responsive to motion vector values from the first multiplexer means for selecting best matched block data, and second multiplexer means for selecting least block difference values in response to horizontal and vertical least difference value signals.

In accordance with the invention there is also provided a block matching system, for comparing current frame data to data of prior and later reference frames. The matching system includes input means for supplying current frame data, interpolated next frame data, previous frame output data and second previous frame output data, and first, second and third block matching circuit means (each coupled to each receive current frame data and to respectively receive next, previous and second previous frame data inputs) for comparing current frame data and data in a reference frame to derive least difference values and best matched block data. The matching system also includes comparator means for generating a control signal indicative of the least value among said three difference values and multiplexer means and responsive to such control signal for selecting the overall best matched block data.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
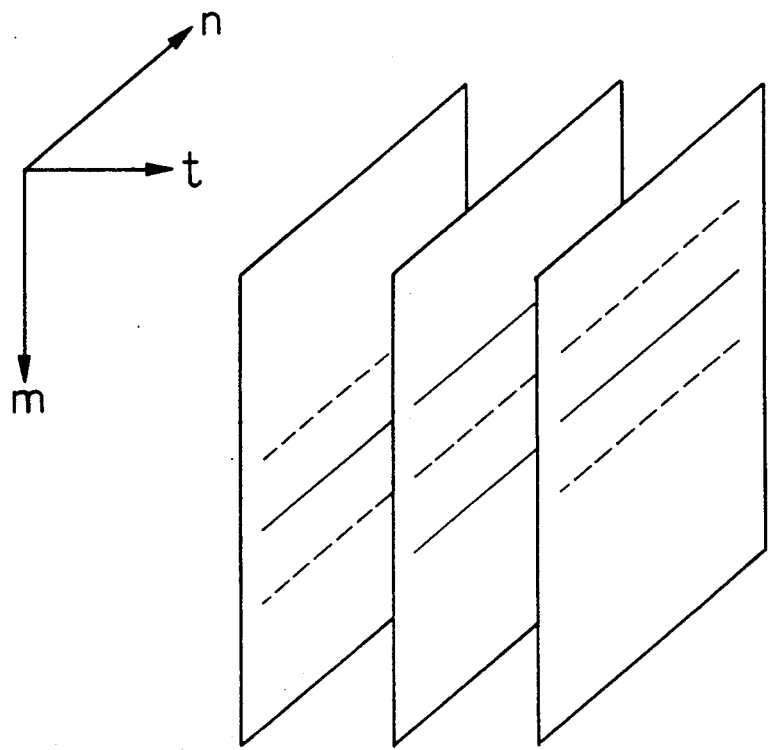
FIG. 1 shows the three-dimensional domain of a sampled image sequence.
Figure 2:
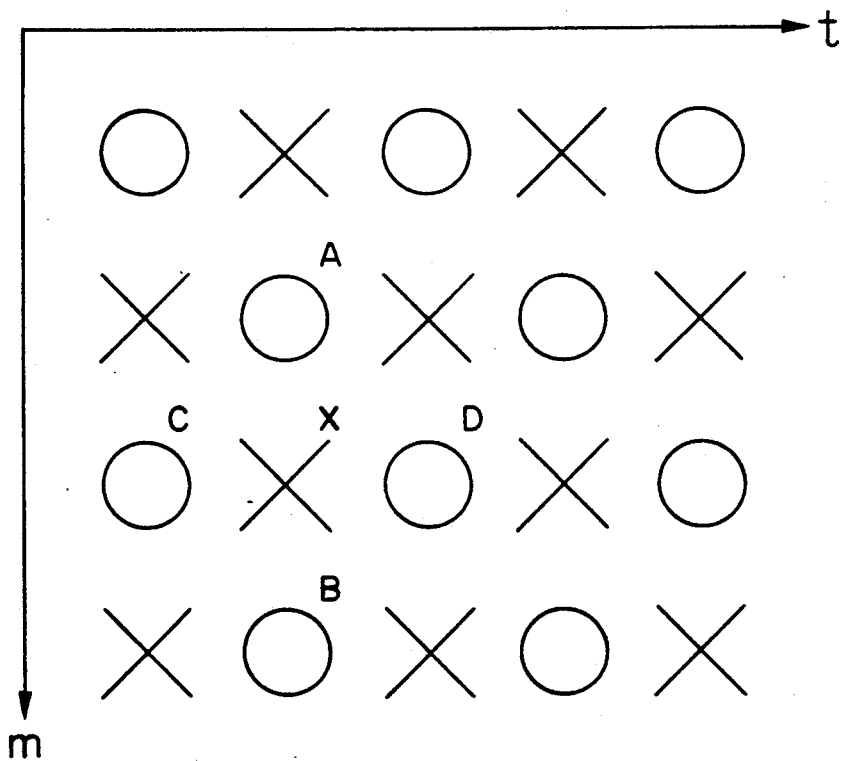
FIG. 2 shows a vertical-temporal grid of the image sequence with n held constant.
Figure 3:
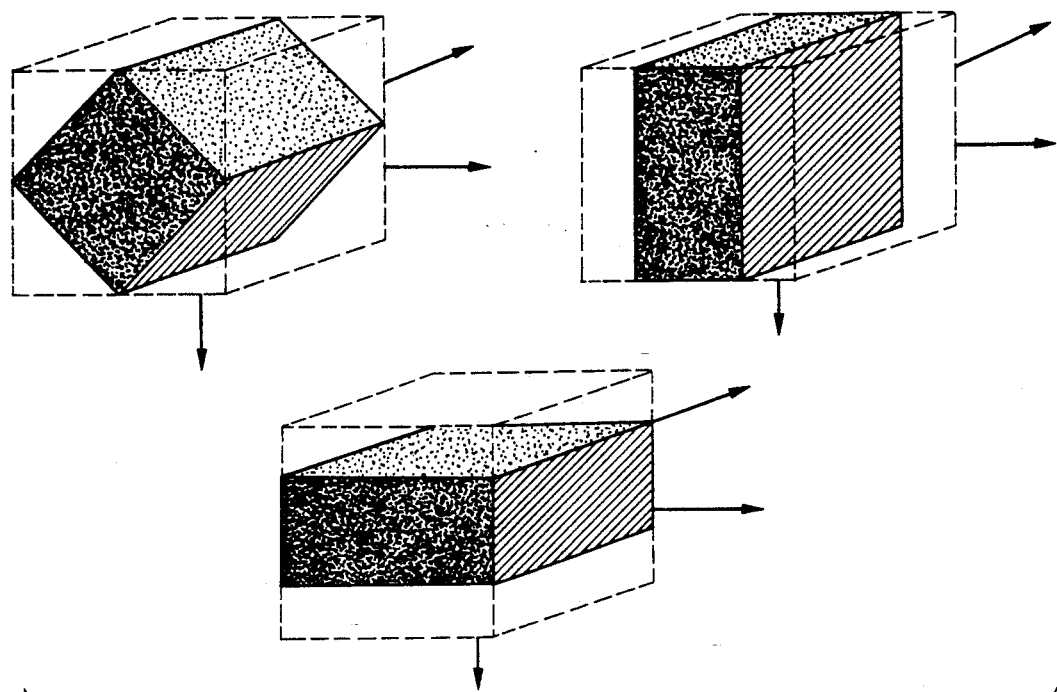
FIG. 3 shows three-dimensional frequency responses for three low-pass filters.
Figure 4:
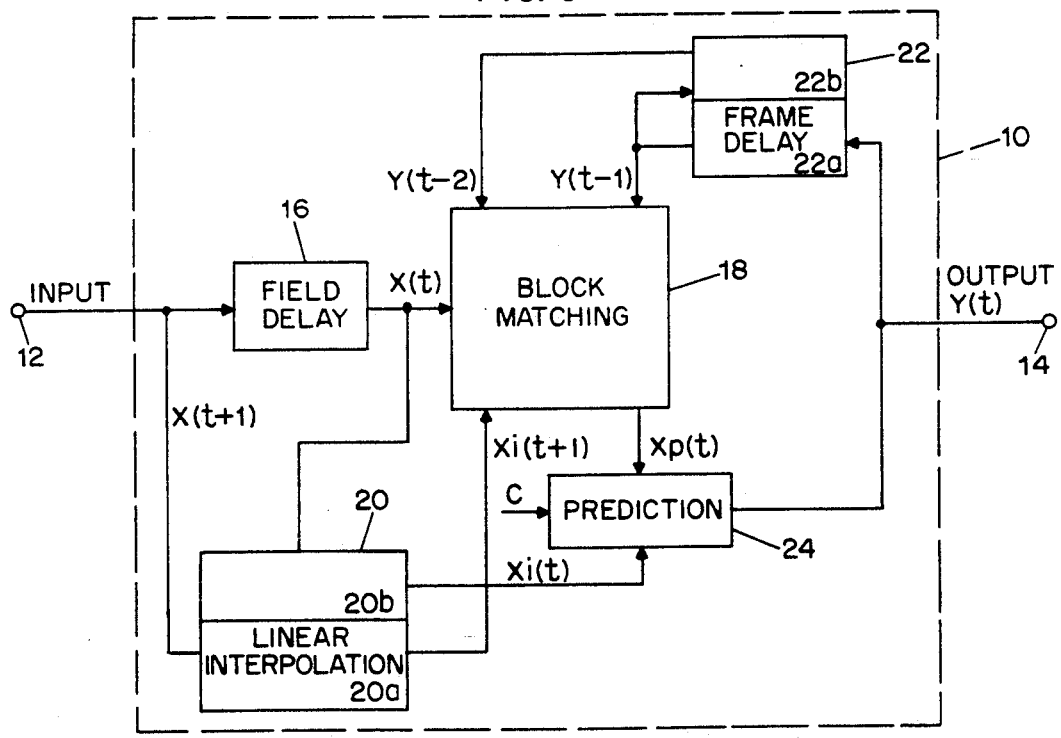
FIG. 4 is a block diagram of an interlaced data processing system in accordance with the invention.

Referring now to FIG. 4, there is illustrated a system for processing interlaced data signals in accordance with the invention. As shown, processing system 10 includes an input terminal 12 for coupling successive fields of interlaced data, wherein each field omits pixel data at line positions at which pixel data is included in preceding and succeeding fields. In the NTSC system, as illustrated by FIG. 2, each field omits alternate lines of data and the prior and next fields include picture data only on such alternate lines. System 10 also includes an output terminal 14 at which processed frame output data is provided after filling in the omitted pixel data in each field interval in accordance with the invention to provide full frames of data of the field rate.

As used herein:

"field" refers to an incomplete frame of data, for example, the alternate fields of an NTSC television signal;

"frame" refers to a complete frame of data, for example, the composite of two fields of NTSC data, or a field of an NTSC television signal with missing lines of data completed by insertion of estimated values for pixel positions in such lines;

"previous frame" refers to the frame immediately preceding a field or frame in point;

"second previous frame" refers to the frame immediately preceding the previous frame;

"next field" refers to the field immediately following a field or frame in point;

"prior" refers to fields or frames occurring at times before that in point; and

"later" refers to fields or frames occurring at times after that in point.

In FIG. 4, system 10 includes input means, shown as terminal 10 and field delay unit 16, arranged so that when a field of data denoted as $X(t+1)$ for reference timing purposes is supplied to terminal 10, the field $X(t)$ will be supplied to block matching system 18. Thus, by supplying the "next" field, $X(t+1)$, to terminal 10, the "current" field, $X(t)$, is supplied to unit 18. The input means also supplies the input signal to linear interpolation means 20.

Linear interpolation means 20 is effective to fill in an approximation of the pixel data at missing lines of each individual field by interpolation of pixel data at corresponding positions in preceding and succeeding lines of the same individual field, so as to provide full frames of alternating lines of actual input pixel data and interleaved lines of interpolated data, at the frame rate. As shown, section 20a of unit 20 receives the next field input data $X(t+1)$ directly from input terminal 12 and its output is an interpolated full frame version $Xi(t+1)$. Similarly, section 20b receives current field input data $X(t)$ from delay unit 16 and its output is an interpolated full frame version $Xi(t)$.

Figure 5:
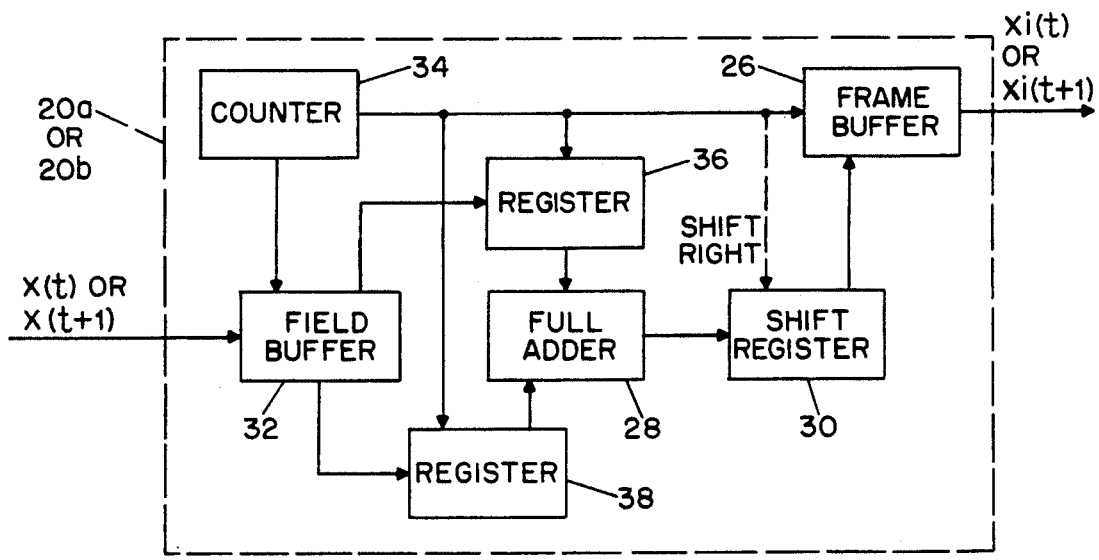
FIG. 5 is a block diagram of a linear interpolation unit useful in the FIG. 4 system.

Referring more specifically to FIG. 5, there is illustrated an embodiment of a suitable linear interpolation circuit. In FIG. 5, linear interpolations are performed between two scanning lines of one field to generate the missing intermediate line. This is done by full adder means 28 and a shift register 30 for each missing pixel. As shown, the input field containing only even or odd lines of a frame is input to field buffer 32. Under the control of values provided by counter means 34, two pixels are selected which are at the same horizontal position on two consecutive lines (i.e., the lines before and after the missing line position) and stored separately in the two registers 36 and 38. The values of the two pixels are then added in means 28 and shifted to the right by one bit in shift register 30, which is equivalent to dividing the sum of the two pixel values by a factor of two. The same process is applied for every missing pixel of the field, sequentially. In practice, this sequence of operations is performed in parallel through use of additional adder and register combinations. The output signal of unit 20a (and of unit 20b) is a linearly interpolated frame. As indicated, inputting $X(t+1)$ to section 20a of unit 20 results in the interpolated output $Xi(t+1)$ and, similarly, interpolating of input $X(t)$ in section 20b results in the interpolated output $Xi(t)$. In the embodiment shown, linear interpolation means 20 is made up of two identical sections 20a and 20b operating independently.

The FIG. 4 processing system also includes delayed coupling means, shown as frame delay unit 22, for providing previous frame output data and second previous frame output data. As shown, output frame data $Y(t)$ which is provided to output terminal 14 is also coupled to frame delay section 22a and sequentially to section 22b. Operationally, timing is such that as a series of output frames are coupled to terminal 14, at the time the current frame output data $Y(t)$ appears at terminal 14, the previous frame output $Y(t-1)$ will appear at the output of section 22a and the second previous frame output $Y(t+2)$ will appear at the output of section 22b. The frame output data for these purposes is provided at the output of prediction unit 24, which will be described below. Field and frame delay units 16 and 22 (shown as including identical sections 22a and 22b operating independently) are effective to provide total delays at their outputs equal to one-half cycle and one cycle, respectively, one cycle being equal to the reciprocal of the frame rate. The form of buffer units 16 and 22 will be discussed with reference to FIG. 14, however appropriate structure and operation will be apparent to those skilled in the art.

Referring now to block matching system means 18, it receives as inputs the $Y(t-1)$ and $Y(t-2)$ outputs from frame delay unit 22, the current field data $X(t)$ from field delay unit 16 and the interpolated next frame data $Xi(t+1)$ from interpolation unit 20, via input means shown as input terminals 40, 42, 44 and 46, respectively. System 18 functions to compare current frame data to interpolated next frame data, previous frame output data and second previous frame output data to select overall best matched data for blocks of pixels for the current frame. Such overall best matched data $Xp(t)$ is then supplied to prediction unit 24, which will be discussed below.

Figure 6:
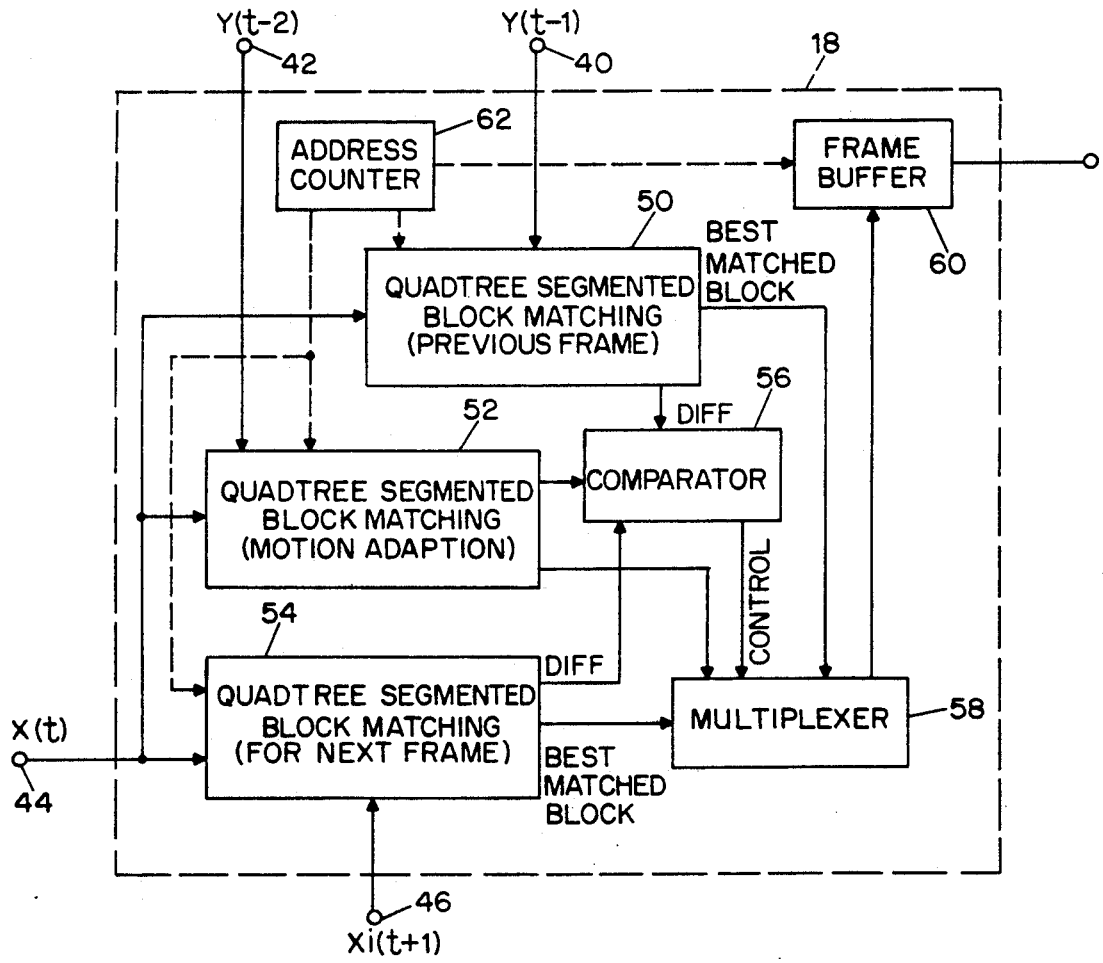
FIG. 6 is a block diagram of a block matching system in accordance with the invention.

FIG. 6 provides additional detail on block matching system means 18. The inputs to unit 18 via terminals 40, 42 and 46 serve as reference frames for processing by three block matching circuit means, shown as quadtree segmented block matching subsystems 50, 52 and 54, which are substantially identical with differences to be discussed. Block matching circuits 50, 52 and 54 operate to compare current frame data and particular reference frame data to each generate two separate outputs, least difference and best matched block. The first output represents the least difference between two input frames with respect to a block of pixel data. The best matched block is the block in the reference frame corresponding to such least difference.

As shown in FIG. 6, in addition to the three block matching circuits 50, 52 and 54, the matching system 18 includes comparator means 56, which receives the difference output from each of units 50, 52 and 54, and multiplexer means 58, which receives each of the three best-matched block outputs from those units. System 18, as illustrated, also includes frame buffer 60 coupled to the output of multiplexer 58 and address counter 62, which provides address control signals to units 50, 52, 54 and 60. The output from buffer 60 is the current frame data $X_p(t)$ appearing at output terminal 64. Operationally, as comparator 56 receives the three least difference inputs, it chooses the least value from among the three possibilities and generates a control signal which is coupled to multiplexer 58 to determine which one of the three best-matched block inputs is coupled to frame buffer 60 for each block of pixels. The best-matched block coupled to buffer 60 thus represents the overall best-matched data. The structure and operation of units 56, 58, 60 and 62 as appropriate to implement the invention will be apparent to those skilled in the art once the concepts of the present invention are understood. The comparator 56, for example, may utilize a TTL7486 integrated circuit for comparing two 4-bit binary numbers, with two such circuits used to compare two 8-bit numbers. In total, four such integrated circuits can be used in order to accomplish comparison of the three input difference values.

Each of the three block matching circuit means 50, 52 and 54 in FIG. 6 performs a 4×4 block matching from the current frame to a particular previous reference frame. Actually, it is a 4×2 matching because two lines of the current block of pixel data are missing. In particular, as shown, circuit 50 performs this matching between current and previous frames, circuit 52 between current and second previous frames, and circuit 54 between current and next (future) frames. As indicated in FIG. 6, circuit 52 provides a motion adaption function as will be further discussed, and as such differs from circuits 50 and 54 in that it need only perform block matching at the zero vector block. Thus, with reference to FIG. 7, the motion adaption circuit 52 will be active only when the data received by unit 72 of circuit 52, as will be further discussed, comes from the same address of both buffer units 74 and 76 of unit 72. Except for this simplification, block matching circuits 50, 52 and 54 may be of the same design as further shown in FIG. 7.

Figure 7:
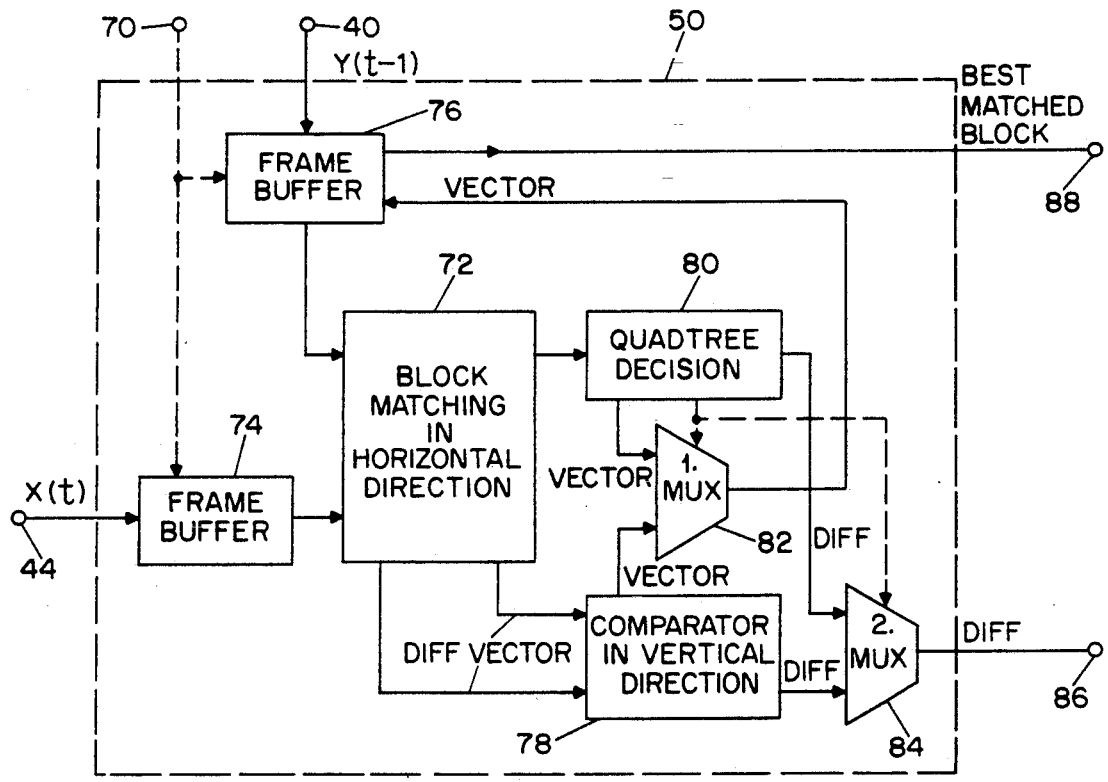
FIG. 7 is a block diagram of a block matching circuit useful in the FIG. 6 system.

Referring now more specifically to FIG. 7, there is shown an embodiment of block matching circuit means 50, as representative of the similar units 50, 52 and 54 in FIG. 6. As illustrated, circuit 50 includes input means for supplying current frame data $X(t)$, reference frame data $Y(t-1)$, and address control signals (from counter 62 in FIG. 6), shown as input terminals 40, 44 and 70, respectively. Also included are horizontal matching means, shown as the block matching in horizontal direction unit 72, for determining the best matched block horizontally as between current frame data coupled via buffer means shown as frame buffer 74 and reference frame data coupled via buffer means 76, which operate under the control of address signals received at terminal 70 from counter 62 in FIG. 6. As shown, block matching circuit 50 also includes vertical comparator means, shown as comparator in vertical direction unit 78, for comparing difference values related to vertical direction vectors to select least difference values and corresponding motion vectors. Quadtree decision means, shown as quadtree decision unit 80, operates to determine block size to be processed based on a predetermined threshold value. As illustrated in FIG. 7, first and second multiplexer means, indicated as mux 82 and mux 84, respectively, receive vector and difference outputs from vertical comparator 78 and decision unit 80. Second mux 84 selects the least block difference values in response to horizontal and vertical difference values and first mux 82 selects motion vector values corresponding to the best matched block based on horizontal and vertical motion vector values, in response to control signals provided by decision unit 80. The output least block difference values from mux 84 are coupled to output terminal 86. Buffer means 76 couples to output terminal 88 best matched block data selected from the input reference frame data on the basis of the motion vector values from mux 82. In this case, for unit 50, the relevant input reference frame data is $Y(t-1)$, whereas for units 52 and 54 it is $Y(t-2)$ and $X_i(t+1)$, respectively.

Figure 8:
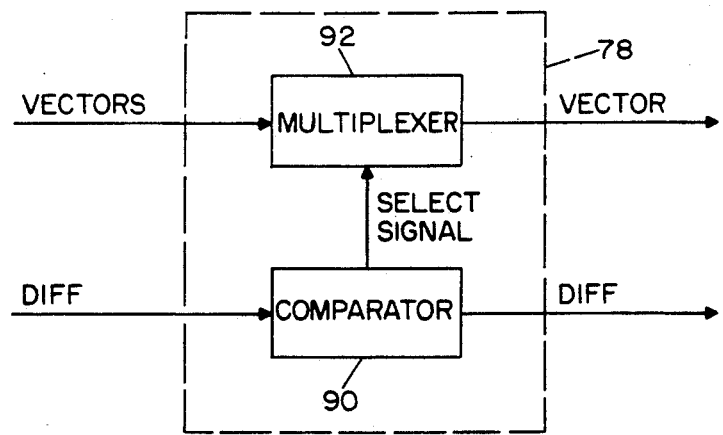
FIG. 8 is a block diagram of vertical direction comparator useful in the FIG. 7 block matching circuit.
Figure 9:
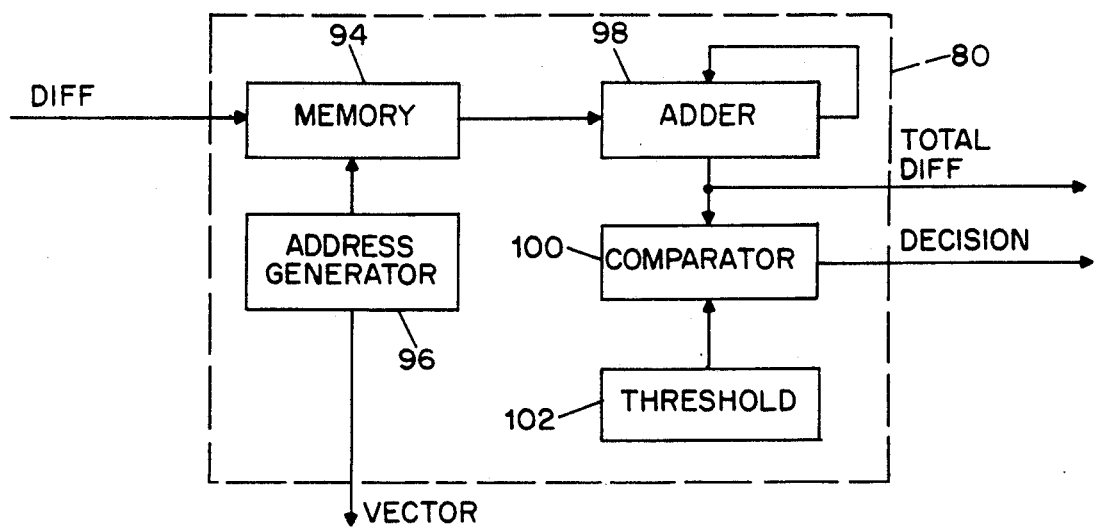
FIG. 9 is a block diagram of a quadtree decision unit useful in the FIG. 7 block matching circuit.

Operationally, in the FIG. 7 circuit, horizontal matching unit 72 receives two inputs, the current block of current frame data $X(t)$ and the reference data from the reference frame $Y(t-1)$. It selects the block which is best matched in the horizontal direction, the corresponding least difference ("diff") and motion vectors ("vectors"). The quadtree decision unit 80 and vertical comparator unit 78 determine whether to use 8×8 blocks or 4×4 blocks and the best matched block and least difference are then determined. The vertical comparator unit 78 takes six difference values and six pairs of motion vectors which come from segmented block matching parts. Each difference value and motion vector represents a vertical direction. The difference values are compared and the least value and the corresponding vector are selected. The vertical comparator means 78, as shown in more detail in FIG. 8, compares the six possible difference values and chooses the smallest one through operation of comparator 90. At the same time, it couples a select signal to the multiplexer 92 to select the corresponding vector. The quadtree decision means 80, as shown in more detail in FIG. 9, determines whether a block should be divided, or not. The difference values of 4×4 blocks are first stored in memory unit 94 operating under the control of address generator unit 96, which also supplies control signals to mux 84 and mux 82 in FIG. 7. Then the difference values of the same 8×8 block are added in adder unit 98. The sum is compared in comparator 100 with a threshold value which is stored in a PROM threshold unit 102. If the sum is less than the reference threshold, the 8×8 block is used; otherwise, 4×4 is used. The decision output of this unit 80 is coupled to mux 84 and mux 82 in FIG. 7, which generate the proper difference value and motion vector.

Figure 10:
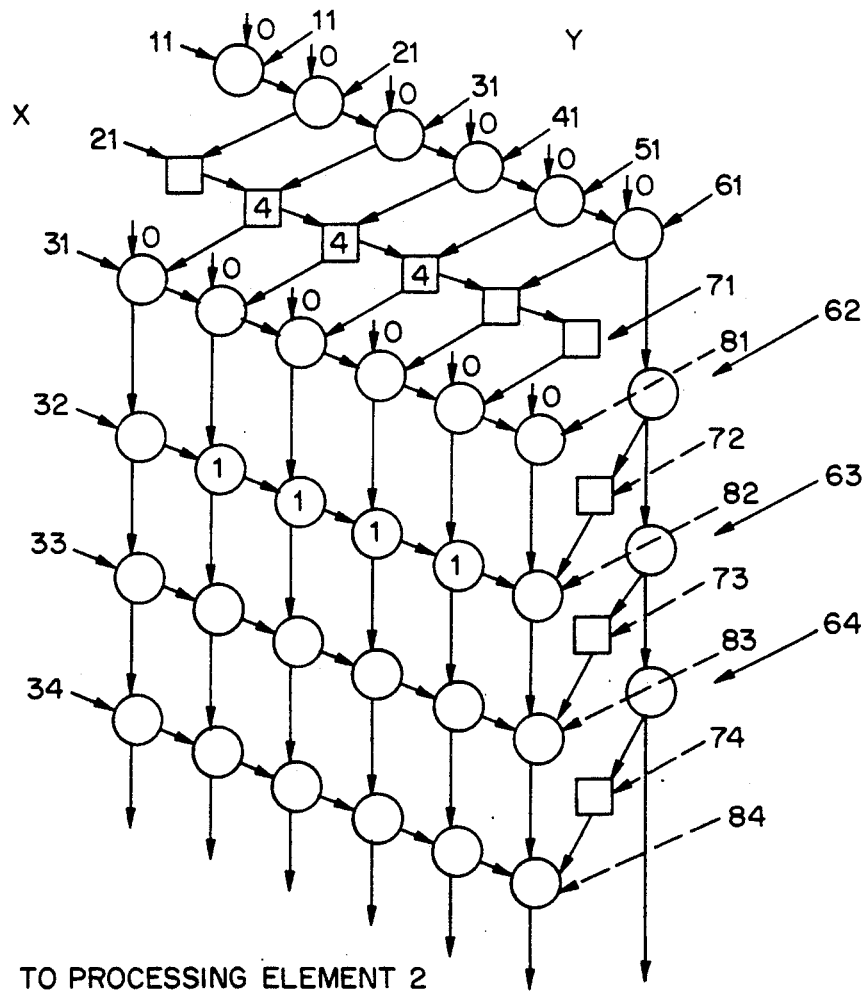
FIG. 10 illustrates a systolic array useful in the FIG. 7 block matching circuit and FIG. 10A further illustrates a processing element used in FIG. 10.

Referring now to FIG. 10, there is shown a systolic array able to carry out a 4×2 motion block matching as previously referred to with reference to block matching circuits 50, 52 and 54 in FIGS. 6 and 7. The X at upper left represents the current input block with a 4×2 size. The Y at upper right refers to the reference data with a size equal to $(4+2*d_{max})\times 4$, where $d_{max}$ is the maximum searching distance of the block matching. The two digit numbers around the array in FIG. 10 are the coordinates of the input and reference data (note that these coordinate values do not correspond to the reference numerals connected to various physical elements elsewhere in the drawings). The coordinates 21, 22, 23, 24 of the input block are the pixels at lines at which data is omitted in the interlaced fields whose values are to be delivered, so their input values are equal to zero. As noted in FIG. 10, the circular elements as illustrated are commonly referenced as processing element 1. The FIG. 10 also includes delay elements shown as squares, commonly referenced as delay element 4. Processing element 1 is shown in more detail in FIG. 10A.

Figure 10A:
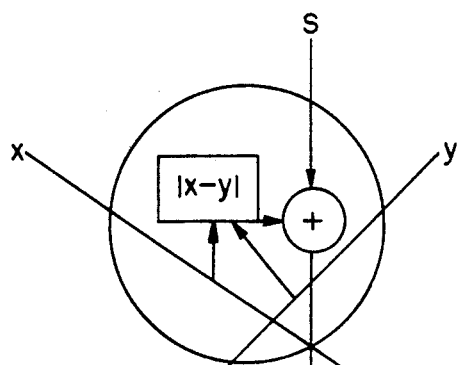

In element 1 as illustrated in FIG. 10A, absolute difference operations are performed between X and Y data on a pixel-by-pixel basis and the result is added to the sum (S) from the preceding processing element. The X and Y data and new result S is then passed to succeeding processing elements. The absolute difference operation is a two's complement operation after a substraction. Thus, first store the difference between X and Y in a register. To get the two's complement value of the register, one is added to the inverse of each bit in the register. In FIG. 10, the delay elements 4 are registers which synchronize the data streams. The output data from the bottom of FIG. 10 is coupled to the inputs of processing elements 2 as shown in FIG. 11.

Figure 11:
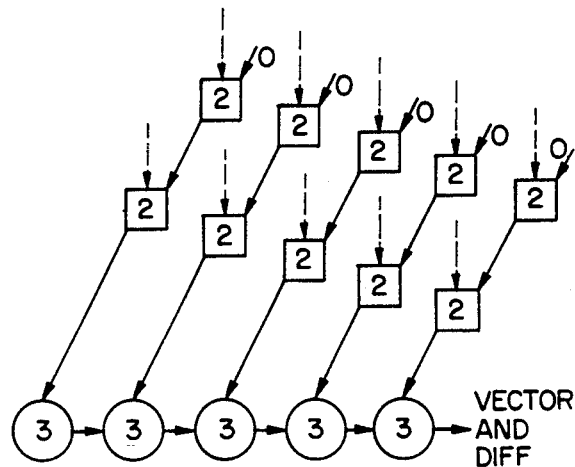
FIG. 11 illustrates an additional portion of the FIG. 10 array and FIG. 11A further illustrates a processing element used in FIG. 11.
Figure 11A:
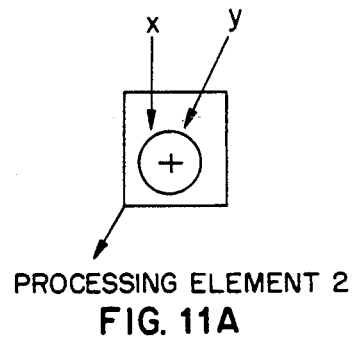

In FIG. 11, processing elements 2 are adders, as shown in FIG. 11A, which add the two inputs to the element. The output of each processing element 2 is the total difference value between the current block and one possible block of reference frame data. The processing elements 1 and 2 perform the function of equation (4) to be described. Those difference values are sent to processing elements 3, which are comparators. The minimum value of the difference values is chosen to provide the best match to the current block of pixel data in the horizontal direction. Processing element 3 can be implemented through application of the TTL7485 integrated circuit previously referred to. The processing element 3 performs the function of equation (5) to be described.

For processing in the vertical direction, as in vertical comparator 78 in FIG. 7, the same systolic arrays can be employed in parallel. The number of systolic arrays required is determined by the number of $d_{max}$ in the relationship $(2*d_{max}+1)$. For each block of the current frame data a systolic array system, as described above, is required. The outputs of the vertical arrays are coupled to another array of the processing element 3 to find a minimum value which is the function of equation (7) to be described. After all the blocks are processed, the best results are passed to the decision and mux units in FIG. 7 for further processing.

Figure 12:
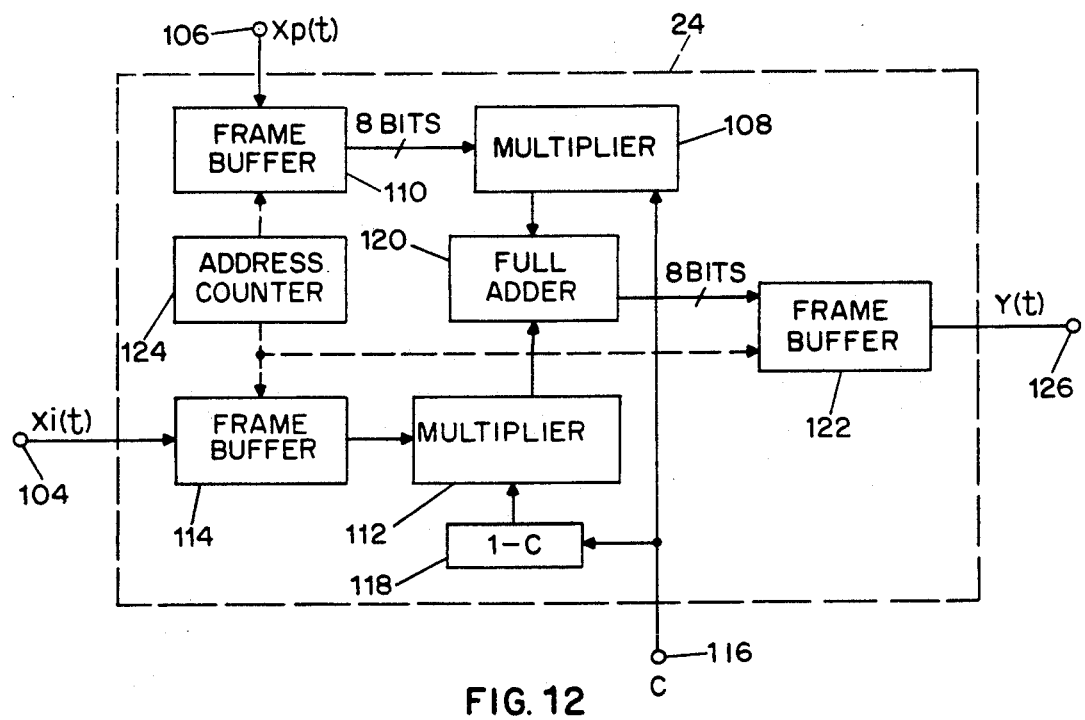
FIG. 12 is a block diagram of a prediction circuit useful in the FIG. 4 system.

The makeup and operation of block matching system 18 of FIG. 4 have now been described with reference to FIGS. 6 through 11. The output of system 18 is the current frame data Xp(t) which is coupled to prediction means 24 in FIG. 4. Referring now to FIG. 12, prediction unit 24 is shown in greater detail. In FIG. 12, the prediction means 24 includes input means, shown as input terminals 104 and 106, for supplying interpolated current frame data Xi(t) and selected overall best matched block data Xp(t) as derived in block matching system 18 in FIG. 4. Also, included in FIG. 12, is first multiplier means, shown as multiplier unit 108, which receives the best matched block data via frame buffer 110, coupled to terminal 106. Multiplier unit 108 acts to multiply the best matched data by a selectable constant C, which has a value less than 1 (less than unity). Second, multiplier means, shown as multiplier unit 112, receives the current frame data via frame buffer 114 coupled to terminal 104 and is effective to multiply that current data by the value of the difference between constant C and unity (i.e., by 1−C). As indicated by input 116 in FIG. 12, the value of constant C as selected is set into multiplier 108 to control its output level and is also provided to unit 118 which causes the difference value 1−C to be set into multiplier 112. The noise limitation effects associated with these multiplication values will be discussed further.

The FIG. 12 prediction unit 24 further includes adder means, shown as full adder unit 120, which receives and adds the outputs of multipliers 108 and 112 and provides the resulting sum on a pixel-by-pixel basis to frame buffer 122. Also included is address counter unit 124 which provides address signals for processing control to buffers 110, 114 and 122. The output of frame buffer 122 at output terminal 126 is the final processed frame output data Y(t) which as shown in FIG. 4, is coupled to output terminal 14 of the processing system 10. The output data Y(t) from prediction unit 24 is also coupled to frame delay unit 22 to provide a succession of output frames which are delayed to provide reference frame inputs to block matching system 18 as indicated in FIG. 4.

Operationally, the prediction unit 24 as shown in FIG. 12 functions to determine the final processed frame output data values of the missing pixels in each field to form the complete field output data Y(t). This is accomplished by implementation of the following formula:

$$Y(t)=C*X_p(t)+(1-C)*X_i(t)$$

where Xi(t) is the linearly interpolated input signal from interpolation unit 20, Xp(t) is the best matched result from block matching system 18 and C is the selected constant, which functions as a noise reduction parameter. Two multipliers, such as units 108 and 112, and a full adder, such as unit 120, are needed for each pixel prediction as indicated from the above equation. After Xi(t) and Xp(t) are stored in buffers 114 and 110, address counter 124 is utilized to keep track of the order of the pixels. For each pixel, the data from the respective multipliers 108 and 112 is first multiplied by C or 1−C, respectively. Experimentally, it has been found that C normally has a value close to 1 and a value of C=0.9 has been determined to be optimum in typical applications. The two multiplicative results are added in adder 120 and stored in frame buffer 122. The resulting output of prediction unit 24 is the processed current frame output Y(t) at terminal 126 (and a stream of similar data representing subsequent frames).

Figure 13:
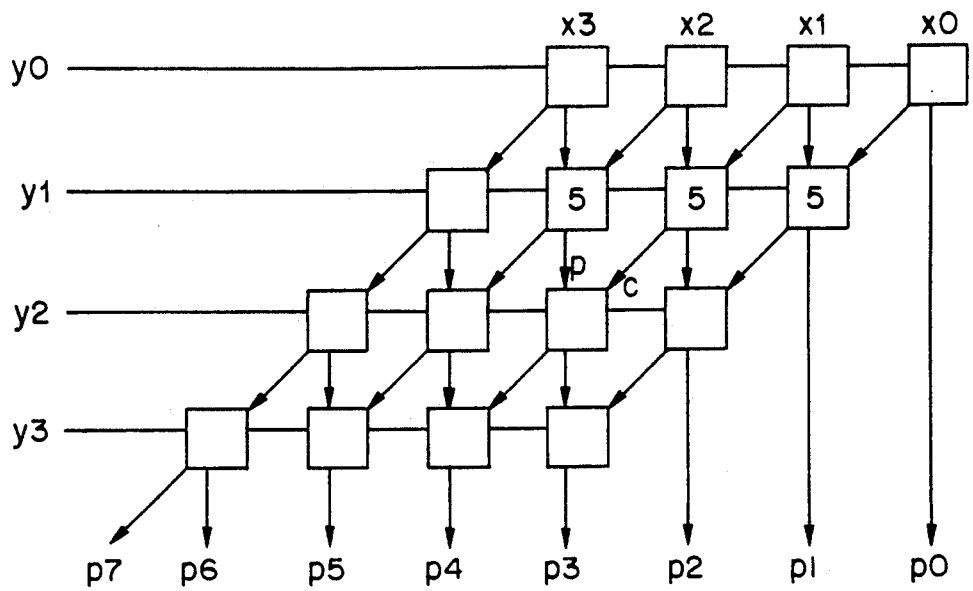
FIG. 13 illustrates a multiplier utilizing systolic arrays, which is useful in the FIG. 12 prediction circuit and FIG. 13A further illustrates a processing element used in FIG. 13.
Figure 13A:
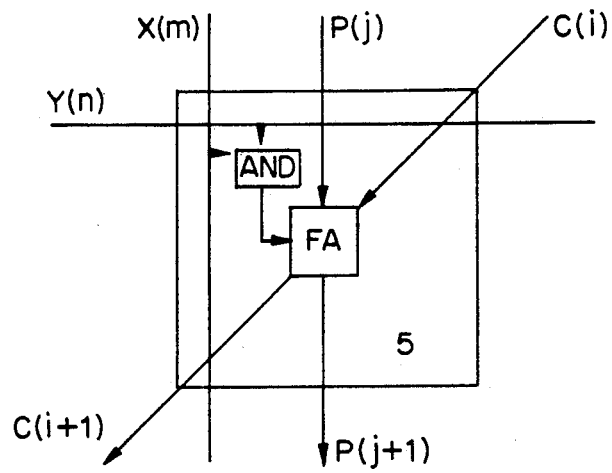

Referring now to FIG. 13, there is illustrated one example of a multiplier, such as units 108 and 112 used in FIG. 12. The FIG. 13 multiplier utilizes systolic arrays. It is a 4 bit by 4 bit multiplier so that the maximum output is 8 bits. Each processing element 5 shown as a square in FIG. 13 is illustrated in greater detail in FIG. 13A. Each element 5 includes an AND gate and a full adder (FA) as shown in FIG. 13A. As data is coupled to processing element 5, X and Y bits first undergo a logical AND operation, and are then added to the resultant of the preceding processing element. The requirement for an 8 bit multiplier is accomplished by an 8×8 systolic array using the same processing elements.

Figure 14:
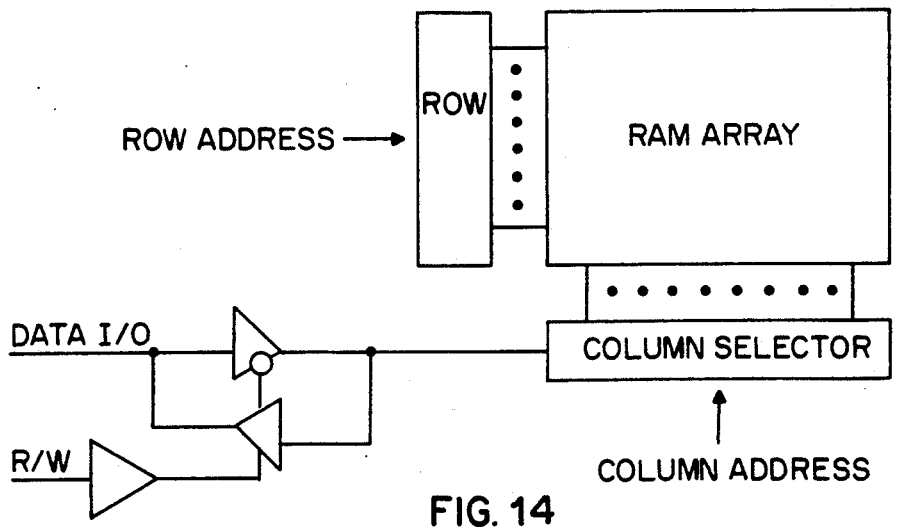
FIG. 14 shows a frame buffer of the type useful in the FIG. 4 system.

With the foregoing description, those skilled in the art can provide appropriate elements in implementation of the prediction unit 24. For example, FIG. 14 illustrates basic form of a frame or field buffer as used in different areas of the system (such as 16 or 22a or 22b in FIG. 4, for example). If the frame size is MxN pixels, MxN cells are typically needed in a random access memory (RAM) as shown in FIG. 14, in order to store a frame. The read/write (R/W) signal controls the entry of data into and recovery of data from the RAM. After data is stored in the buffer unit, it is kept there for a cycle which is equal to the reciprocal of the frame rate. The row and column addresses determine where data is to be stored and read, and the appropriate address selectors can typically be implemented by demultiplexer arrangements. With respect to this description and the other systems and subsystems as shown and described, it will be obvious that once these examples are understood variations and alternative embodiments can be substituted by those skilled in the art in implementation of the invention.

SUMMARY OF THEORY AND OPERATION

As described, systems in accordance with the invention for processing or "deinterlacing" interlaced data signals make use of time-recursive motion compensated prediction techniques. Recursive filters are known to have lower implementation complexity for a similar filtering effect, compared to nonrecursive ones. Even first order linear recursive filters have infinite impulse response and produce an output reflecting the history of inputs. A generalization of this fact is used in the invention, which is based on motion compensation to use the history of the previous fields for prediction of the missing lines of the current field. The following nonlinear time-recursive relation is used:

$$\underline{y}(t) = F[\underline{y}(t-1), \underline{x}(t)] \quad (1)$$

in which $\underline{x}(t)$ is the input field at time t, $\underline{y}(t)$ is the output frame at time t, and F is a function to be defined. Also, $\hat{\underline{x}}(t)$ is defined as the frame at time t, coming from linear spatial interpolation of $\underline{x}(t)$. Note that the field $\underline{x}(t)$ is included in half of the lines of the frame $\underline{y}(t)$, and of the frame $\hat{\underline{x}}(t)$ as well. The initial condition $\underline{y}(0)$ is chosen equal to $\hat{\underline{x}}(0)$.

The frame $\underline{y}(t)$ in equation (1) is found by motion compensation. This can be done in various ways. The method used is motion estimation by quadtree-based segmented block matching of blocks of the known field $\underline{x}(t)$ on the frame $\underline{y}(t-1)$, allowing displacement vectors with half pixel accuracy. The initial size of blocks is 16×8, which corresponds to a 16×16 square block with half the lines missing. In this way, if a missing line happens to also be missing from the previous field, it will still be taken from the higher resolution signal $\underline{y}(t)$ which contains information from the previous fields.

A future field, e.g. $\underline{x}(t+1)$, can also be used in evaluating the frame $\underline{y}(t)$. In that case, equation (1) with look-ahead becomes:

$$\underline{y}(t) = F[\underline{y}(t-1), \underline{x}(t+1)] \quad (2)$$

in which each block from the field $\underline{x}(t)$ can be matched to either the previous interpolated frame $\underline{y}(t-1)$, or the next linearly interpolated frame $\hat{\underline{x}}(t+1)$, depending on which of the two results in smaller error. Providing for look-ahead results in minimal delay, equal to the field-refresh period. This is important whenever there are sudden changes of scene, in which case there can be no proper match between $\underline{x}(t)$ and $\underline{y}(t-1)$.

In order to avoid unattended propagation of noise, the following relation gives better results than equation (2):

$$\underline{y}(t) = c\hat{\underline{x}}(t) + (1-c)F[\underline{y}(t-1), \underline{x}(t), \underline{x}(t+1)] \quad (3)$$

where c is between 0 and 1, usually close to 1, as discussed. In experiments, a near optimum value was found at c=0.9.

Motion adaptation is also used to maintain the sharpness and quality of the motionless part of each frame. Corresponding blocks in $\underline{x}(t)$ and $\underline{x}(t-2)$ are compared; if they are well matched, $\underline{y}(t)$ is generated by $\underline{y}(t-1)$ only:

$$\underline{y}(t) = \begin{cases} \underline{y}(t-1), & \text{if no motion;} \\ \text{as in (3),} & \text{otherwise.} \end{cases}$$

This modification keeps background sharp and noiseless. Otherwise, flickering temporal patterns with a period of two frames can appear even in totally motionless areas.

Some of the blocks may contain a piece of a moving object and a piece of the background, or may contain pieces of more than one moving object. The resulting interpolated values would be incorrect for part of the block. In order to avoid this quality degradation, after determining the optimum block matching, corresponding to the displacement vector $(d_m, d_n)$, the maximum absolute deviation over all pixels of the 16×8 block:

$$\max\{|x(m,n,t) - y(m-d_m, n-d_n, t-1)|\}$$

or $$\max\{|x(m,n,t) - \hat{x}(m-d_m, n-d_n, t+1)|\}$$

is evaluated, depending on whether optimum matching was found with the past or future frame, respectively. If the maximum deviation exceeds a certain threshold, then the block is separated into four sub-blocks of size 8×4, and block matching is repeated for each of the sub-blocks. The same procedure is repeated for one more level. If the maximum deviation exceeds the threshold, then each block is again separated into four sub-blocks of size 4×2 pixels. This quadtree-based segmented block matching provides an effective compromise between complexity and quality.

Consideration is now directed to quadtree-based segmented block matching, which is normally the practical bottleneck of this system. With reference to the three step design in the book "VLSI Array Processor", by S.Y. Kung (Prentice Hall, 1988, see Chapters 3 and 4), applicants have developed the application of systolic arrays as referred to above. More particularly, let x(i,j) be the objective block of size N×N, and y be the reference data, then we have $$S(d_m, d_n) = \sum_{m=1}^{N} \sum_{n=1}^{N} |x(m,n) - y(m + d_m, n + d_n)|,$$

$$-d_{max} \leq d_m, d_n \leq d_{max}$$

where $S(d_m, d_n)$ are the distortion measure between x and y corresponding to displacement $(d_m, d_n)$, and $d_{max}$ is the maximum allowed displacement in each dimension. The motion vector, v, is determined by $$u = \min S(d_m, d_n) \ (d_m, d_n)$$

$$v = (d_m, d_n)|_u.$$

Each pixel difference evaluation requires four parameters, resulting in a four dimensional $(m, n, d_m, d_n)$ problem. In order to map to a dependence graph easily, it is decomposed into a three-dimensional problem and an one-dimensional problem by fixing $d_n$ first, that is, $$S_{d_n}(d_m) = \sum_{m=1}^{N} \sum_{n=1}^{N} |x(m,n) - y_{d_n}(m + d_m, n)|, \quad (4)$$

$$-d_{max} \leq d_m \leq d_{max}$$

$$u_{d_n} = \min_{(d_m)} S_{d_n}(d_m) \quad (5)$$

$$v_{d_n} = (d_m)|u_{d_n} \quad (6)$$

After $v_{d_n}$ is found, the u is determined by $$u = \min_{d_n} u_{d_n} \quad (7)$$

Therefore, the motion vector of the current block is given by $$v = (v_{d_n}, d_n)|n \quad (8)$$

Formulas (4)–(8) work for traditional block matching. Additional capabilities already discussed with reference to the illustrated embodiment of the invention are:
(1) the block size is adaptive based on values of the minimum absolute difference between the current and the reference block; and
(2) the data of the current block comes from a field instead of a frame, i.e., half of the lines of the block are missing, and provision is made to process data in this form.

In addition, motion adaptation based on difference calculation is an important component in the algorithm and has been accommodated in the preceding description of the implementation and operation of processing systems in accordance with the invention.

OPERATION WITH COLOR SIGNALS

In application to color television type signals, systems for deinterlacing and their operation can be enhanced through use of the signals carrying the color information. Instead of using luminance data only, performance can be enhanced through use of both luminance data signals and chrominance data signals.

The algorithm described (see equations (4) through (8) above) is performed on Y, U, and V signals at the same time, and one difference value ($Y_{err}$, $U_{err}$, or $V_{err}$) is generated for any 16×8 block of each signal separately. The total difference value ($T_{err}$) of one block was defined as:

$$T_{err} = Y_{err} + d^*(U_{err} + V_{err})$$

in which d is a positive value and the least $T_{err}$ represents the best match for the block.

Where motion compensation is performed on both luminance and chrominance, more calculations are needed. However, those additional calculations can be performed in parallel and the quality of the deinterlaced picture is enhanced because a better motion prediction is made. The hardware complexity is slightly augmented.

Figure 15:
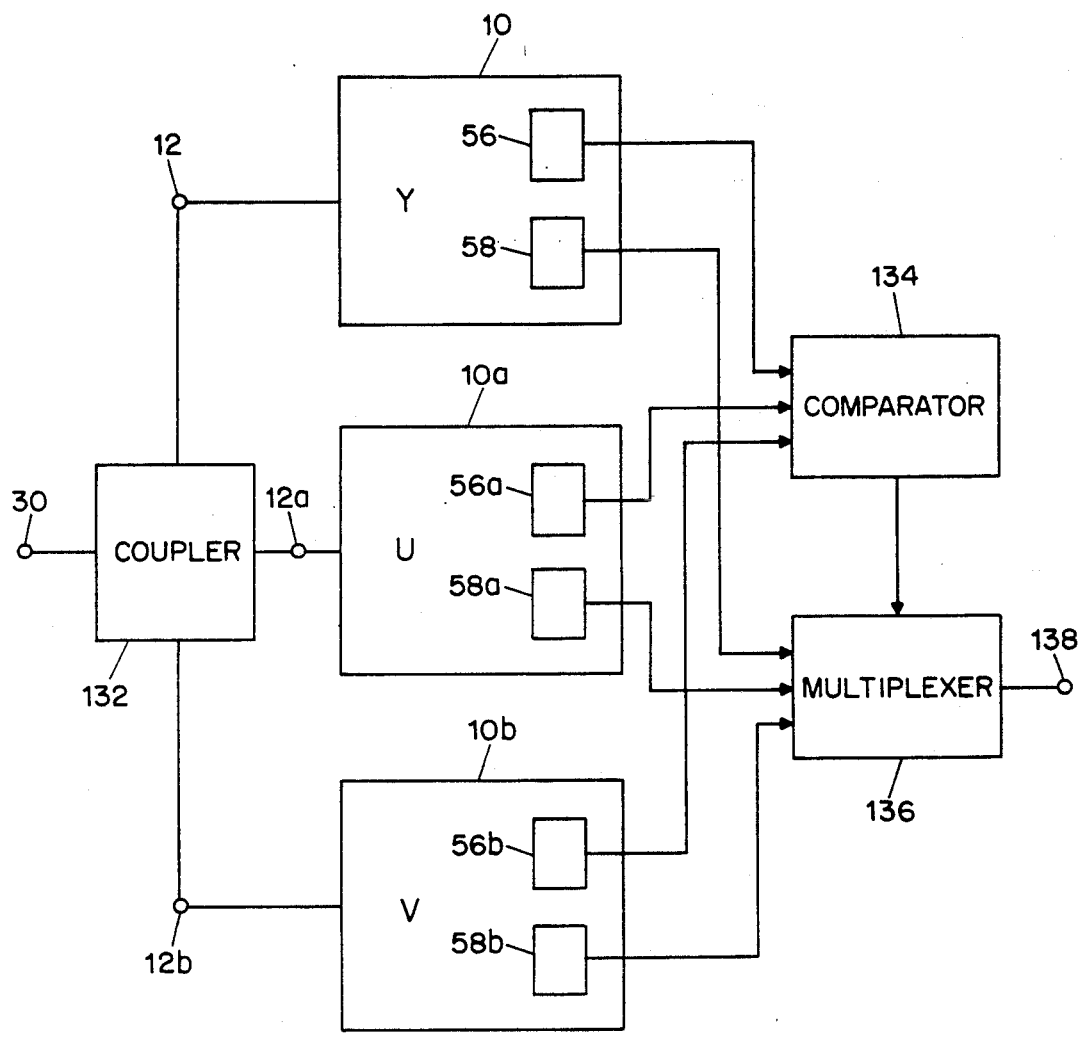
FIG. 15 is a block diagram of an interlaced data processing system adapted for processing color signals in accordance with the invention.

With reference to FIG. 15, a parallel form of implementation of the invention for use with color signals is illustrated. As shown in FIG. 15, processing system 10 of FIG. 4 is placed in parallel with two additional processing systems 10a and 10b of substantially similar form. A color television signal coupled to input means, shown as input terminal 130, is processed by signal separation means 132, which couples Y, U and V components of the input signal to input terminals 12, 12a and 12b of parallel systems 10, 10a and 10b, respectively. As indicated, least difference signals from comparator units 56, 56a and 56b (see comparator 56 in FIG. 6) and overall best matched block signals from multiplexer units 58, 58a and 58b (see multiplexer 58 in FIG. 6) are derived in the three processing systems 10, 10a and 10b as previously discussed with respect to system 10.

FIG. 15, as shown, also includes comparator means 134 which receives the Y, U and V least difference signals and provides a control signal indicative of the smallest value least difference signal. In form and operation, comparator 134 may be similar to comparator 56 in FIG. 6, as previously discussed. The control signal from comparator 134 is coupled to multiplexer means 136, which also receives the Y, U and V overall best matched block inputs from systems 10, 10a and 10b. In form and operation, multiplexer 136 may be similar to multiplexer 58 in FIG. 6, as previously discussed. Multiplexer 136 is effective to select the overall best matched block for color operation. While the color system shown and described with reference to FIG. 15 utilizes three parallel systems and has not been structurally optimized for color operation, it will be understood by those skilled in the art that changes may be made to avoid unnecessary duplication of elements and otherwise provide an effective color system for operation in accordance with the invention.

In order to numerically measure the effects of this algorithm, a progressive color sequence of a garden scene (the "garden"), was interlaced by dropping half of the lines. After the deinterlacing algorithm was applied to the "garden" sequence, the mean square error ("MSE") between the original pictures and the generated ones was calculated. The average MSE of all the frames in the sequence decreases as d increases. The decreasing tendency is slight but systematic, which proves that color information does help motion prediction. The best value of d for the "garden" sequence was found to be 0.8.

OPERATION WITH REDUCED DATA RATE CODING

Pyramid coding has been found to be a useful tool in many image processing applications, because it supplies multi-resolution signals (see for example, "The Laplacian Pyramid as a Compact Image Code", IEEE Transactions on Communications, Vol. COM-31, No. 4, April 1983). The traditional way to generate pyramids is to use linear interpolation. However, the enhancement signal, generated in such approaches, has high energy which makes a high compression rate hard to achieve. In contrast, applicants have developed a different and improved result through the use of non-linear interpolation.

Figure 16:
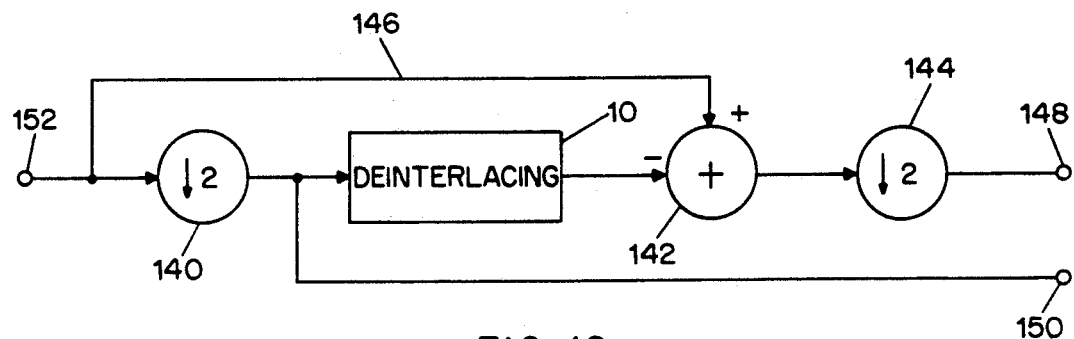
FIG. 16 is a block diagram of an interlaced data processing system permitting reduced data rate transmission in accordance with the invention.

Interlacing is a form of subsampling or downsampling by a factor of two and the deinterlacing process described earlier is one form of nonlinear interpolation. In new reduced data rate coding systems using nonlinear deinterlacing, the energy of an enhancement signal is reduced significantly. In FIG. 16, downsampling is performed at temporal-vertical domain (interlacing) and no prefilter is used because of reasons mentioned above, thus achieving critical sampling. Therefore, the number of samples for the enhancement signal in FIG. 16 is only half that of such previous approaches. Because of both critical sampling and energy reduction of the enhancement signal (compared with linear deinterlacing), it can be coded very efficiently with low bit rate, achieving reduced data rate coding.

Referring more specifically to FIG. 16, there is shown a system for processing data to achieve reduced data rate coding in accordance with the invention. As illustrated, the FIG. 16 system includes a deinterlacing system 10 such as shown and described with reference to FIG. 4. Also included are units 140, 142, and 144 arranged with system 10 and bypass coupling 146 to provide an enhancement signal at output terminal 148 and interlaced signal output at terminal 150 in response to an input progressive format signal provided to input means shown as terminal 152 in the form of input frames of progressively scanned image sequence data. As illustrated, the FIG. 16 circuit also includes first and second sampling means, shown as downsampling units 140 and 144, respectively, and comparison means, shown as adder 142 which acts to subtract pixel values to determine difference values.

The signal at terminal 152 is progressive (non-interlaced) format image data, each frame of which is downsampled by a factor of two in the vertical direction by sampling unit 140. The output signal at terminal 150 is thus in the form of fields of interlaced data which also represent the input to system 10. The output signal coupled from system 10 to unit 142 is a progressive signal again, the missing lines having been predicted and filled in as described above with reference to system 10. Because the signals coupled to comparison unit 142 from system 10 and via connection 146 from input 152 have the same dimension, variations or differences between them can be calculated. The difference calculation is carried out by full adder unit 142. As between the two inputs to unit 142, one field (the field represented by the lines not omitted by action of unit 140) will be identical and the differences between these identical fields are all zeros. Since there is no need to retain those zeros during transmission, downsampling is performed again in sampling unit 144 to omit those zero entries from the variation or difference signal provided by unit 142. As a result, the enhancement signal provided at output terminal 148 has efficient low bit rate coding. The enhancement signal and interlaced signal at output terminals 148 and 150 are effective in combination to provide accurate representation of the input data with reduced data rate coding.

Figure 17:
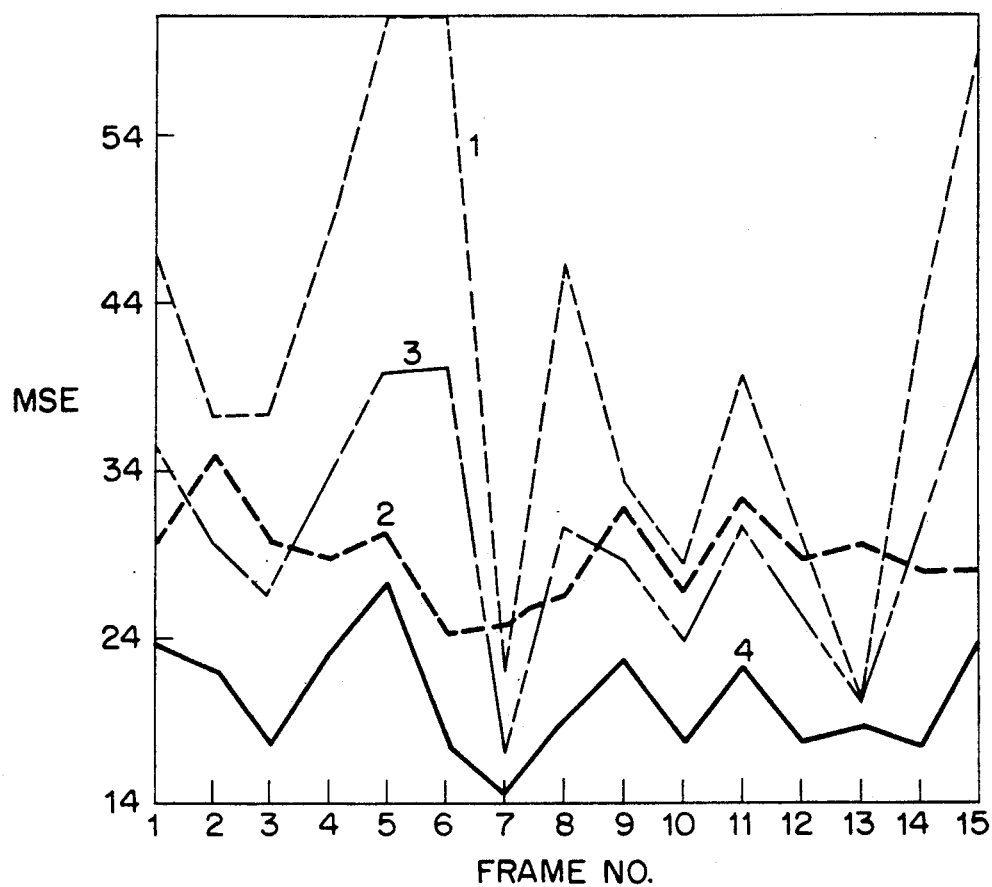
FIG. 17 is a block diagram of a downsampling circuit useful in the FIG. 16 system.

Unit 142 is a full adder with a 2's compliment input and is effective to perform the desired subtraction. Units 140 and 144 which may be identical are shown in greater detail in FIG. 17. As illustrated in FIG. 17, an input frame is first stored in a frame buffer 154. The address counter 156 generates the line addresses of the frame. The count provided by counter 156 is increased by two each time, so every other line is skipped. The results are stored in a field buffer 158 which provides the field signal output.

If other stages which perform purely spatial or purely temporal non-linear interpolation are cascaded, the approach described can be applied to generate multiresolution signals which could be used to make HDTV or IDTV compatible with traditional interlaced TV. This scheme produces coded transmission signals compatible with TV formats at various resolutions.

Since the enhancement signals have different statistics compared to normal pictures, different coding techniques may achieve lower bit rate than DCT (Discrete Cosine Transform) coding. Adaptive arithmetic coding is one method that is suitable for coding low-energy signals, like the enhancement signal at terminal 148 in FIG. 16.

Adaptive arithmetic coding separates a coding problem into two parts: first, finding a statistical model for the entity to be modeled; and second, performing the coding based on the model with optimum performance. The symbols in the enhancement signal are coded sequentially based on an estimate of probability which is calculated by using a particular template. Before coding, the pixel values enhancement signals are linearly quantized with adjustable quantization steps. The bit rate is controlled by choosing the size of the zero-zone and the quantization steps. The bit rate is very sensitive to the change of the zero-zone size.

The pixels around the current pixel X decide the state of pixel X. Based on previous statistics and the state, the probability and entropy of pixel X is evaluated, and the minimum cost (in bits) for coding X is equal to $-\log_2($prob$)$, where prob is the probability of X under the state. The total cost of the whole image is the bit rate that can be achieved. According to simulation testing, when the average energy of the enhancement signal is around 20 to 30, it can be coded with 0.3 bits/pixel using arithmetic coding.

SIMULATION RESULTS

In order to numerically measure the effects of the various algorithms, sequences of progressive video images were interlaced by dropping half the lines. The standard progressive "Miss America" sequence commonly used as a standard in tests, was also interlaced by omitting half the lines from each frame. After applying different interpolation algorithms to these interlaced sequences, the outputs were compared with the original sequence in terms of their MSEs evaluated by comparing the interpolated values of all the pixels in the missing lines, with their known actual values. This sequence was used for demonstration purposes and generation of tables with error measurements.

Figure 18:
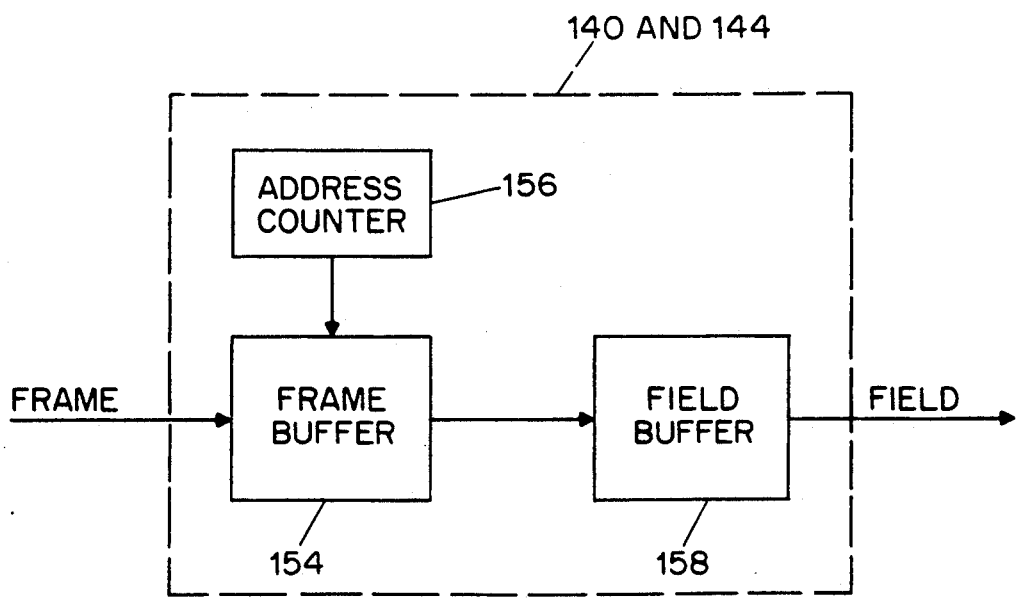
FIG. 18 is a chart comparing error measurements for deinterlacing using the present invention with other approaches, for a sequence of images.

FIG. 18 shows typical MSE curves from a number of successive frames belonging to that sequence. Shown are the MSE's when the interpolated value for each pixel is equal to (see FIG. 2):
(1) that of the previous field [C];

(2) linear spatial interpolation [(A+B)/2];
(3) median filter [Med(A,B,C)]; and
(4) time-recursive motion compensated interpolation, with look-ahead, half pixel accuracy and motion adaptation.

The MSE of the algorithm, as shown in the FIG. 18 data, is being reduced as the index of the algorithm used increases.

The algorithm as described has reasonably low complexity for real time VLSI implementation, since it includes simple straightforward operations and block matching motion estimation. Furthermore, as a result of the use of time-recursive prediction, the frame memory requirements are not severe, because one past frame conveys information from all previously displayed history. Applications include Improved Definition TV Receivers and interpolation for multiresolution multiple channel video coding.

While there have been described what are believed to be the preferred embodiment of the invention, those skilled in the art will recognize that other and further modifications may be made thereto without departing from the spirit of the invention, and it is intended to claim all such embodiments as fall within the true scope of the invention.

We claim:

1. A system, for processing interlaced data signals to provide data omitted from individual fields, comprising:
   input means for coupling current and later fields of interlaced data, each such field omitting pixel data for line positions at which pixel data is included in prior and later fields;
   interpolation means, coupled to said input means to receive said later field data, for providing pixel data at omitted line positions in a field by interpolation of pixel data at corresponding positions in prior and later lines of said field;
   delayed coupling means for providing prior frame output data;
   block matching system means, coupled to said input means, interpolation means and delayed coupling means, for comparing current field data with interpolated later frame data and previous frame output data to select overall best matched data for blocks of pixels for use in frame output data.

2. A system for processing interlaced data signals, as described in claim 1, wherein said block matching system means comprises:
   a plurality of block matching circuit means selectively coupled to said input means, each such matching circuit means for comparing current frame data with data in a particular prior or later frame to derive least difference values and best matched block data; and
   comparator means, coupled to said block matching circuit means, for generating control signals indicative of the least value based on comparison of least difference values derived by said plurality of block matching circuit means.

3. A system for processing interlaced data signals as described in claim 1, additionally including a prediction circuit comprising:
   input means for supplying interpolated current frame data and selected overall best matched block data;
   first multiplier means, coupled to said input means, for multiplying said best matched block data by a predetermined constant less than unity;
   second multiplier means, coupled to said input means, for multiplying said current frame data by the value of the difference between said predetermined constant and unity; and
   adder means, coupled to said first and second multiplier means, for providing processed frame output data representative of the sum on a pixel by pixel basis of the signals resulting from said multiplications.

4. A system for processing interlaced data signals representative of color images, comprising:
   a plurality of systems for processing interlaced data signals substantially as described in claim 1;
   means for coupling signals representing monochrome content of input fields of interlaced image data and signals representing chrominance content of said input data to different ones of said plurality of systems; and
   means coupled to said plurality of systems, for selecting final best matched data for blocks of pixels from among the overall best matched data provided at the output of each of said plurality of systems.

5. A system for processing data signals to achieve reduced data rate coding, comprising:
   input means for coupling input frames of progressive format data;
   first sampling means, coupled to said input means, for sampling said input data to provide fields of interlaced data;
   deinterlacing means, coupled to said first sampling means, comprising a system for processing interlaced data signals as described in claim 1, for providing reconstituted frames of data;
   comparison means, responsive to said input frames and reconstituted frames of data, for comparing said frames to derive variation signals representative of variations in pixel data values; and
   second sampling means, coupled to said comparison means, for sampling said variation signals for deriving an enhancement signal by deletion of zero value pixel positions;
   whereby, said enhancement signal in combination with said fields of interlaced data provide accurate representation of said input data with reduced data rate coding.

6. A system, for processing interlaced data signals to provide data omitted from individual fields, comprising:
   input means for coupling current and next fields of interlaced data, each such field omitting pixel data for line positions at which pixel data is included in prior and later fields;
   interpolation means, coupled to said input means to receive said next field data, for providing pixel data at omitted line positions in a field by interpolation of pixel data at corresponding positions in prior and later lines of said field;
   delayed coupling means for providing previous frame output data and second previous frame output data;
   block matching system means, coupled to said input means, interpolation means and delayed coupling means, for comparing current field data to interpolated next frame data, previous frame output data and second previous frame output data to select overall best matched data for blocks of pixels; and
   prediction circuit means, coupled to said interpolation means and matching system means, for combining interpolated current frame data with said overall best matched data on a pixel by pixel basis in proportions responsive to a selectable constant and for supplying frame output data to said delayed coupling means and to an output point.

7. A system for processing interlaced data signals, as described in claim 6, wherein said block matching system means comprises:
- a plurality of block matching circuit means selectively coupled to said input means, each such matching circuit means for comparing current frame data with data in a particular prior or later frame to derive least difference values and best matched block data; and
- comparator means, coupled to said block matching circuit means, for generating control signals indicative of the least value based on comparison of least difference values derived by said plurality of block matching circuit means.

8. A system for processing interlaced data signals representative of color images, comprising:
- a plurality of systems for processing interlaced data signals substantially as described in claim 6;
- means for coupling signals representing monochrome content of input fields of interlaced image data and signals representing chrominance content of said input data to different ones of said plurality of systems; and
- means coupled to said plurality of systems, for selecting final best matched data for blocks of pixels from among the overall best matched data provided at the output of each of said plurality of systems.

9. A system for processing data signals to achieve reduced data rate coding, comprising:
- input means for coupling input frames of progressive format data;
- first sampling means, coupled to said input means, for sampling said input data to provide fields of interlaced data;
- deinterlacing means, coupled to said first sampling means, comprising a system for processing interlaced data signals as described in claim 4, for providing reconstituted frames of data;
- comparison means, responsive to said input frames and reconstituted frames of data, for comparing said frames to derive variation signals representative of variations in pixel data values; and
- second sampling means, coupled to said comparison means, for sampling said variation signals for deriving an enhancement signal by deletion of zero value pixel positions;
- whereby, said enhancement signal in combination with said fields of interlaced data provide accurate representation of said input data with reduced data rate coding.

10. A system for processing data signals to achieve reduced data rate coding, comprising:
- input means for coupling input frames of progressive format data;
- first sampling means, coupled to said input means, for downsampling said input frame data by a factor of two in the vertical direction to provide fields of interlaced data;
- deinterlacing means, coupled to said first sampling means, comprising a system for processing interlaced data signals as described in claim 4, for providing reconstituted frames of data;
- comparison means, responsive to said input frames and reconstituted frames of data, for subtracting the pixel values of said reconstituted frames of data from the pixel values of said input frames of data to derive difference signals representative of differences in pixel data values; and
- second sampling means, coupled to said comparison means, for downsampling said difference signals by a factor of two in the vertical direction for deriving an enhancement signal by deletion of alternate line pixel positions representing zero value pixel data;
- whereby, said enhancement signal in combination with said fields of interlaced data provide accurate representation of said input data with reduced data rate coding.

11. A system, for processing interlaced data signals to provide data omitted from individual fields, comprising:
- input means for coupling current and next fields of interlaced data, each such field omitting pixel data for line positions at which pixel data is included in prior and late fields;
- interpolation means, coupled to said input means to receive said next field data, for providing pixel data at omitted line positions in a field by interpolation of pixel data at corresponding positions in prior and later liens of said field;
- delayed coupling means for providing previous frame output data and second previous frame output data;
- a block matching system, coupled to said input means, interpolation means and delayed coupling means, comprising:
  - input means for supplying current frame data, interpolated next frame data, previous frame output data and second previous frame output data;
  - first, second and third block matching circuit means, each coupled to said input means to each receive said current frame data and to respectively receive said next, previous and second previous frame data inputs, for comparing current frame data and data in an reference frame to select least difference values and best matched block data;
  - comparator means, coupled to said block matching circuit means to receive first, second and third difference value signals, for generating a contact signal representative of the least value among said three different values;
  - multiplexer means, coupled to said block matching circuit means and comparator means, and responsive to said control signal for selecting the overall best matched block data; and
- prediction circuit means, coupled to said interpolation means and matching system means, for combining interpolated current frame data with said overall best matched data on a pixel by pixel basis in proportions responsive to a selectable constant and for supplying processed frame output data to an output point and to said delayed coupling means.

12. A system for processing data signals to achieve reduced data rate coding, comprising:
- input means for coupling input frames of progressive format data;
- first sampling means, coupled to said input means, for sampling said input data to provide fields of interlaced data;
- deinterlacing means, coupled to said first sampling means, comprising a system for processing interlaced data signals as described in claim 6, for providing reconstituted frames of data;

comparison means, responsive to said input frames and reconstituted frames of data, for comparing said frames to derive variation signals representative of variations in pixel data values; and second sampling means, coupled to said comparison means, for sampling said variation signals for deriving an enhancement signal by deletion of zero value pixel positions;

whereby, said enhancement signal in combination with said fields of interlaced data provide accurate representation of said input data with reduced data rate coding.

13. A block matching system, for comparing current field data to data of prior and later reference frames, comprising:

input means for supplying current field data, interpolated later field data and prior frame output data;

a plurality of block matching circuit means, each coupled selectively to said input means to each receive said current field data and to respectively receive said later and prior frame data inputs, for comparing current field data and data in a reference frame to derive least difference values and best matched block data;

comparator means, coupled to said block matching circuit means to receive a difference value signal for each blocking circuit means, for generating a control signal indicative of the least value among said difference values; and multiplexer means, coupled to said block matching circuit means and comparator means, and responsive to said control signal for selecting the overall best matched block data.

14. A block matching system, as described in claim 13 wherein each of said block matching circuit means comprises:

horizontal matching means, selectively coupled to said input means, for making best matched block comparisons in the horizontal direction as between said current field data and particular later and prior frame data and developing corresponding least different value signals and motion vector signals;

vertical comparator means, coupled to said horizontal matching means, for comparing difference values related to vertical direction vectors to develop least difference value signals and corresponding motion vector signals;

first multiplexer means, coupled to said vertical comparator means and quadtree decision means, for selecting motion vector values corresponding to the best matched block in response to horizontal and vertical motion vector signals;

buffer means, responsive to said input reference frame data and motion vector values from said first multiplexer means, for selecting best matched block data from said input reference frame data; and second multiplexer means, coupled to said vertical comparator means and quadtree decision means, for selecting least block difference values in response to horizontal and vertical least difference value signals.

15. A block matching system, for comparing current field data to data of prior and later reference frames, comprising:

input means for supplying current field data, interpolated next frame data, previous frame output data and second previous frame output data;

first, second and third block matching circuit means, each coupled selectively to said input means to each receive said current field data and to respectively receive said next, previous and second previous frame data inputs, for comparing current field data and data in a reference frame to derive least difference values and best matched block data;

comparator means, coupled to said block matching circuit means to receive first, second and third difference value signals, for generating a control signal indicative of the least value among said three difference values; and multiplexer means, coupled to said block matching circuit means and comparator means, and responsive to said control signal for selecting the overall best matched block data.

16. A block matching system, as described in claim 15, wherein each of said three block matching circuit means comprises:

horizontal matching means, selectively coupled to said input means, for making best matched block comparisons in the horizontal direction as between said current field data and particular later and prior frame data and developing corresponding least different value signals and motion vector signals;

vertical comparator means, coupled to said horizontal matching means, for comparing difference values related to vertical direction vectors to develop least difference value signals and corresponding motion vector signals;

first multiplexer means, coupled to said vertical comparator means and horizontal matching means, for selecting motion vector values corresponding to the best matched block in response to horizontal and vertical motion vector signals;

buffer means, responsive to said input reference frame data and motion vector values from said first multiplexer means, for selecting best matched block data from said input reference frame data; and second multiplexer means, coupled to said vertical comparator means and quadtree decision means, for selecting least block difference values in response to horizontal and vertical least difference value signals.

17. A block matching system, for comparing current field data to data of prior and later reference frames, comprising:

input means for supplying current field data, interpolated next frame data, previous frame output data and second previous frame output data;

address counter means for providing control signals indicative of pixel addresses within a frame of data;

first, second and third block matching circuit means, each coupled to said counter means and selectively to said input means to each receive said current field data and to respectively receive said next, previous and second previous frame data inputs, for comparing current field data and data in a reference frame to derive least difference values and best matched block data;

comparator means, coupled to said block matching circuit means to receive first, second and third difference value signals, for generating a control signal indicative of the least value among said three difference values;

multiplexer means, coupled to said block matching circuit means and comparator means, and responsive to said control signal for selecting the overall best matched block data; and frame buffer means, coupled to said counter means and multiplexer means, for coupling frame output data to an output point.

18. A block matching circuit, for comparing current field data with data in a reference frame comprising:
   input means for supplying current field data and reference frame data;
   horizontal matching means, coupled to said input means, for making best matched block comparisons in the horizontal direction as between said current field and reference frame data and developing corresponding least difference value signals and motion vector signals;
   vertical comparator means, coupled to said horizontal matching means, for comparing difference values related to vertical direction vectors to develop least difference value signals and corresponding motion vector signals;
   first multiplexer means, coupled to said vertical comparator means and horizontal matching means, for selecting motion vector values corresponding to the best matched block in response to horizontal and vertical motion vector signals;
   buffer means, responsive to said input reference frame data and motion vector values from said first multiplexer means, for selecting best matched block data from said input reference frame data; and
   second multiplexer means, coupled to said vertical comparator means and quadtree decision means, for selecting least block difference values in response to horizontal and vertical least difference value signals.

19. A block matching circuit as described in claim 18, additionally comprising quadtree decision means, coupled to said horizontal matching means, for determining block size to be processed based on difference value comparisons to predetermined threshold values.

20. A block matching circuit as described in claim 18, additionally comprising frame buffer means, responsive to said input reference frame data and motion vector values from said first multiplexer means, for selecting best matched block data from said input reference frame data.

21. A block matching circuit, for comparing current field data with data in a reference frame, comprising:
   input means for supplying current field data, reference frame data and address reference signals;
   first frame buffer means, selectively coupled to said input means, for storing current frame data and reading out said data under the control of said reference signals;
   second frame buffer means, selectively coupled to said input means, for storing reference frame data and reading out said data under the control of said reference signals;
   horizontal matching means, coupled to said frame buffer means, for making best matched block comparisons in the horizontal direction as between said current field and reference frame data and developing corresponding least difference value signals and motion vector signals;
   vertical comparator means, coupled to said horizontal matching means, for comparing difference values related to vertical direction vectors to develop least difference value signals and corresponding motion vector signals;
   quadtree decision means, coupled to said horizontal matching means, for determining block size to be processed based on predetermined threshold values;
   first multiplexer means, coupled to said vertical comparator means and quadtree decision means, for selecting motion vector values corresponding to the best matched block in response to horizontal and vertical motion vector signals;
   coupling means, for coupling said first multiplexer means to said second frame buffer means, whereby said buffer means is responsive to said motion vector values from said first multiplexer means, for selecting best matched block data from said input reference frame data; and
   second multiplexer means, coupled to said vertical comparator means and quadtree decision means, for selecting least block difference values in response to horizontal and vertical least difference value signals.

22. A prediction circuit, for providing processed frame output data, comprising: frame data and selected overall best matched block data;
   input means for supplying interpolated current
   first multiplier means, coupled to said input means, for multiplying said best matched block data by a predetermined constant less than unity;
   second multiplier means, coupled to said input means, for multiplying said current frame data by the value of the difference between said predetermined constant and unity; and
   adder means, coupled to said first and second multiplier means, for providing frame output data representative of the sum on a pixel by pixel basis of the signals resulting from said multiplications.

23. A prediction circuit as described in claim 22, additionally comprising means for receiving a representation of said constant and means for deriving the difference between said constant and unity.

24. A prediction circuit as described in claim 22, additionally comprising:
   address counter means for providing control signals indicative of pixel addresses within a frame of data;
   first and second frame buffer means, coupled to said input means and counter means, for respectively coupling said best matched block data and said interpolated current frame data to said first and second multiplier means; and
   third frame buffer means, coupled to said adder means and said counter means, for coupling frame output data to an output point.

25. A system for processing data signals to achieve reduced data rate coding, comprising:
   input means for coupling input frames of progressive format data;
   first sampling means, coupled to said input means, for sampling said input data to provide fields of interlaced data;
   deinterlacing means, coupled to said first sampling means, for processing fields of interlaced data for providing reconstituted frames of data with missing data lines filled in with estimated pixel values;
   comparison means, responsive to said input frames and reconstituted frames of data, for comparing said frames to derive variation signals representative of variations in pixel data values; and
   second sampling means, coupled to said comparison means, for sampling said variation signals for deriving an enhancement signal by deletion of zero value pixel positions;

whereby, said enhancement signal in combination with said fields of interlaced data provide accurate representation of said input data with reduced data rate coding.

26. A system for processing data signals as described in claim 25, wherein:

said first sampling means downsamples input frame data by a factor of two in the vertical direction to provide fields of interlaced data; and said second sampling means downsamples said variation signals by a factor of two in the vertical direction for deriving an enhancement signal by deletion of alternate line pixel positions representing zero value pixel data.

27. A system for processing data signals as described in claim 25, wherein said comparison means subtracts the pixel values of said reconstituted frames of data from the pixel values of said input frames of data to derive variation signals representative of differences in pixel data values.

28. A system for processing data signals as described in claim 26, wherein said comparison means subtracts the pixel values of said reconstituted frames of data from the pixel values of said input frames of data to derive variation signals representative of differences in pixel data values.

29. A method for processing interlaced data signals to provide data omitted from individual fields, comprising the steps of:

(a) providing current field interlaced data, later frame interpolated data and prior frame output data;

(b) comparing blocks of pixels of said current field data with blocks of pixels of said later frame interpolated data and prior frame output data to select best matched data for blocks of pixels from among data in said later and prior frames; and (c) assembling frame output data including such best matched data as selected for each block of pixels in anoutput frame.

30. A method for processing interlaced data signals as described in claim 29, additionally comprising the step of combining interpolated current frame data with said best matched data on a pixel by pixel basis in predetermined proportions for providing noise attenuation in frame output data.

31. A method for processing interlaced data signals as described in claim 29, additionally comprising the step of diminishing the size of the block of pixels used for comparison in step (b) when a difference between pixel values in said current field data and said best matched data exceeds a predetermined threshold value for a particular block of pixels.

32. A method for processing interlaced data signals to provide data omitted from individual fields, comprising the steps of:

(a) providing current field interlaced data next frame interpolated data, previous frame output data and second previous frame output data;

(b) comparing blocks of pixels of said current field data with blocks of pixels of said next frame interpolated data, previous frame output data and second previous frame data to select best matched data for blocks of pixels from among data in said next, previous and second previous frames;

(c) assembling frame output data including such best matched data as selected for each block of pixels in an output frame.

33. A method for processing interlaced data signals as described in claim 32, additionally comprising the step of combining interpolated current frame data with said best matched data on a pixel by pixel basis in predetermined proportions for providing noise attenuation in frame output data.

34. A method for processing interlaced data signals as described in claim 32, additionally comprising the step of diminishing the size of the block of pixels used for comparison in step (b) when a difference between pixel values in said current field data and said best matched data exceeds a predetermined threshold value for a particular block of pixels.

35. A method for processing interlaced color video signals, comprising:

(a) providing current field interlaced data, later frame interpolated data and prior frame output data;

(b) comparing blocks of pixel data representing luminance information of said current field data with blocks of luminance pixel data of said later frame interpolated data and prior frame output data to select best matched data for blocks of pixels from among data in said later and prior frames;

(c) comparing blocks of pixel data representing chrominance information of said current field data with blocks of chrominance pixel data of said later frame interpolated data and prior frame output data to select best matched data for blocks of pixels from among data in said later and prior frames;

(d) comparing best matched data for blocks of pixels as selected in steps (b) and (c) to select overall best matched data for such blocks of data;

(e) assembling frame output data including such best matched data as selected for each block of pixels in an output frame.

36. A method for processing interlaced data signals as described in claim 35, additionally comprising the step of combining interpolated current frame data with said best matched data on a pixel by pixel basis in predetermined proportions for providing noise attenuation in frame output data.

37. A method for processing interlaced data signals as described in claim 35, additionally comprising the step of diminishing the size of the block of pixels used for comparison in step (b) when a difference between pixel values in said current field data and said best matched data exceeds a predetermined threshold value for a particular block of pixels.

38. A block matching method for comparing current frame data with data in a reference frame, comprising the steps of:

(a) providing current frame data and reference frame data;

(b) comparing blocks of pixels of said current frame data with blocks of pixels of said reference frame data to develop least difference signals and motion vector signals representative of horizontal direction comparisons;

(c) comparing said least difference signals and motion vector signals developed in step (b) to develop least difference signals and motion vector signals representative of vertical direction comparisons;

(d) deriving motion vector values corresponding to a best matched block of pixels in response to motion vector signals developed in steps (b) and (c);

(e) selecting best matched data for blocks of pixels from said reference frame data in response to said motion vector values derived in step (d); and
(f) deriving least difference values corresponding to a best matched block of pixels in response to least difference signals developed in steps (b) and (c).

39. A block matching method for comparing frame data as described in claim 38, additionally comprising the step of diminishing the size of the blocks of pixels used for comparison purposes when a least difference value exceeds a predetermined threshold value for a particular block of pixels.

* * * * *

UNITED STATES PATENT AND TRADEMARK OFFICE
CERTIFICATE OF CORRECTION

PATENT NO. : 5,134,480  Page 1 of 4

DATED : July 28, 1992

INVENTOR(S) : Feng-Ming Wang et al.

It is certified that error appears in the above-identified patent and that said Letters Patent is hereby corrected as shown below:

On title page, following item [73], delete "[*] Notice"
The portion of the term of this patent subsequent to Apr. 17, 1992 has been disclaimed."
On title page, item [56], after listing of U.S. PATENT DOCUMENTS", insert the following references:

--                    OTHER DOCUMENTS
"The Laplacian Pyramid as a Compact Image Code", Burt et al., IEEE Transactions on Communications, Vol. Com-31, No. 4, April 1983.

"Encoding for Compatability and Recoverability in the ACTV System", Isnardi et al., IEEE Transactions on Broadcasting, Vol. BC-33, No. 4.

"Gray-Scale Image Coding for Freeze-Frame Videoconferencing", Anastassiou et al., IEEE Transactions on Communications, Vol. Com-34, No. 4, April 1986.

UNITED STATES PATENT AND TRADEMARK OFFICE
CERTIFICATE OF CORRECTION

PATENT NO.   :   5,134,480                    Page 2 of 4

DATED        :   July 28, 1992

INVENTOR(S)  :   Feng-Ming Wang et al.

It is certified that error appears in the above-identified patent and that said Letters Patent is hereby corrected as shown below:

"Motion-Compensated Interpolation from Interlaced and Non-Interlaced Grids", Girod et al.

"Non-Linear Interpolators in Compatible HDTV Image Coding", Devleeschauwer et al. from "Signal Processing of HDTV", Elsevier Science Publishers B.V. (North-Holland) 1988.

"Interlaced to Sequential Conversion for EDTV Application", Doyle from "Signal Processing of HDTV", Elsevier Science Publishers B.V. (North-Holland), 1988.

"An Overview of the Basic Principles of the Q-Coder Adaptive Binary Arithmetic Coder", Pennebaker et al.

"Array Architectures for Block Matching Algorithms", Komarek et al., IEEE Transactions on Circuits and Systems, Vol. 36, No. 10, October 1989.

"Spatial Resolution Enhancement of Images Using Nonlinear Interpolation", Jensen et al.   --.

UNITED STATES PATENT AND TRADEMARK OFFICE
CERTIFICATE OF CORRECTION

PATENT NO. : 5,134,480

DATED : July 28, 1992

INVENTOR(S) : Feng-Ming Wang et al.

It is certified that error appears in the above-identified patent and that said Letters Patent is hereby corrected as shown below:

Col. 2, line 40, "A, B, D" should read -- A, B, C --. Col. 12, line 3, "$\hat{\underline{X}}t + 1)$" should read -- $\hat{\underline{X}}(t+1)$ --. Col. 13, line 11, "u = min $S(d_m,d_n)(d_m,d_n)$" should read $$-- u = \min_{(d_m,d_n)} S(d_m,d_n) \quad --.$$

Col. 16, line 3, "compliment" should read -- complement --.

Col. 20, line 24, "liens" should read -- lines --; line 38, "in an" should read -- in a --;

Col. 21, line 43, "different" should read -- difference --. Col. 22, line 25, "different" should read -- difference --.

UNITED STATES PATENT AND TRADEMARK OFFICE
CERTIFICATE OF CORRECTION

PATENT NO. : 5,134,480

DATED : July 28, 1992

INVENTOR(S) : Feng-Ming Wang et al.

It is certified that error appears in the above-identified patent and that said Letters Patent is hereby corrected as shown below:

Col. 24, lines 22-24,

```
     "frame output data, comprising:
       frame data and selected overall
       best matched block data;

input means for supplying
       interpolated current"
``` should read

```
  --   frame output data, comprising:
         input means for supplying
           interpolated current frame
           data and selected overall
           best matched block data;   --.
```

Col. 25, line 60, "interlaced data" should read -- interlaced data, --.

Signed and Sealed this

Eighteenth Day of January, 1994

Attest:

BRUCE LEHMAN

*Attesting Officer*          *Commissioner of Patents and Trademarks*

UNITED STATES PATENT AND TRADEMARK OFFICE
CERTIFICATE OF CORRECTION

PATENT NO. : 5,134,480

DATED : July 28, 1992

INVENTOR(S) : Feng-Ming Wang, et al.

It is certified that error appears in the above-identified patent and that said Letters Patent is hereby corrected as shown below:

Column 19, line 40, "claim 4" should read --claim 6--.
Column 19, line 64, "claim 4" should read --claim 6--.

Column 20, line 67, "claim 6" should read --claim 11--.

Signed and Sealed this

Eighth Day of November, 1994

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,134,480
DATED : July 28, 1992
INVENTOR(S) : Feng-Ming Wang et al.

It is certified that error appears in the above-indentified patent and that said Letters Patent is hereby corrected as shown below:

Col. 1, before line 5, insert -- The United States Government has certain rights in this invention pursuant to Contract CDR-881111 awarded by the National Science Foundation. --

Signed and Sealed this

Twenty-seventh Day of February, 1996

Attest:

BRUCE LEHMAN

*Attesting Officer*        *Commissioner of Patents and Trademarks*